United States Patent
Kulkarni

(10) Patent No.: US 9,245,193 B2
(45) Date of Patent: Jan. 26, 2016

(54) DYNAMIC SELECTION OF SURFACES IN REAL WORLD FOR PROJECTION OF INFORMATION THEREON

(75) Inventor: Tejas Dattatraya Kulkarni, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 13/549,388

(22) Filed: Jul. 13, 2012

(65) Prior Publication Data

US 2013/0044193 A1 Feb. 21, 2013

Related U.S. Application Data

(60) Provisional application No. 61/525,628, filed on Aug. 19, 2011.

(51) Int. Cl.
| | | |
|---|---|---|
| *H04N 9/31* | (2006.01) | |
| *H04N 13/04* | (2006.01) | |
| *G06F 3/01* | (2006.01) | |

(Continued)

(52) U.S. Cl.
CPC ................. *G06K 9/228* (2013.01); *G06F 3/011* (2013.01); *G06F 3/017* (2013.01); *G06F 3/0304* (2013.01); *G06K 9/00671* (2013.01); *H04N 9/3194* (2013.01)

(58) Field of Classification Search
CPC ............ H04N 9/3194; H04N 13/0497; H04N 13/0404; H04N 13/0409; G06K 9/00671; G06K 9/228
See application file for complete search history.

(56) References Cited

U.S. PATENT DOCUMENTS

| 4,731,860 A | 3/1988 | Wahl |
|---|---|---|
| 7,061,525 B1 | 6/2006 | Tanaka et al. |

(Continued)

FOREIGN PATENT DOCUMENTS

| EP | 1365584 A2 | 11/2003 |
|---|---|---|
| JP | H10210342 A | 8/1998 |

(Continued)

OTHER PUBLICATIONS

"Framework" at "http://igesture.org/userguide_framework.html" as available on May 21, 2012, 3 pages.

(Continued)

*Primary Examiner* — Jefferey Harold
*Assistant Examiner* — Sean Haiem
(74) *Attorney, Agent, or Firm* — Silicon Valley Patent Group LLP

(57) ABSTRACT

One or more devices capture a scene of real world, and process one or more image(s) which include distances to points on surfaces in the real world. The distances are used to automatically identify a set of surfaces in the real world. Then, the one or more devices check whether a surface in the set is suitable for display of an element of information to be projected into the scene. On finding that a surface is suitable, a transform function is automatically identified, followed by automatic application of the transform function to the element of the information. A transformed element, which results from automatically applying the transform function, is stored in a frame buffer coupled to a projector, at a specific position in the frame buffer identified during the check for suitability. When no surface is suitable, user input is obtained, followed by projection of information as per user input.

26 Claims, 14 Drawing Sheets

(51) Int. Cl.
*G06F 3/03* (2006.01)
*G06K 9/00* (2006.01)
*G06K 9/22* (2006.01)

(56) References Cited

U.S. PATENT DOCUMENTS

| | | | |
|---|---|---|---|
| 7,905,610 B1 | 3/2011 | Shapiro | |
| 8,646,000 B2 | 2/2014 | Kang et al. | |
| 2004/0184013 A1* | 9/2004 | Raskar et al. | 353/121 |
| 2004/0258314 A1 | 12/2004 | Hashimoto | |
| 2007/0050468 A1 | 3/2007 | Gazit | |
| 2008/0069404 A1 | 3/2008 | Lee et al. | |
| 2009/0179734 A1 | 7/2009 | Do et al. | |
| 2009/0237328 A1 | 9/2009 | Gyorfi et al. | |
| 2010/0026960 A1* | 2/2010 | Sprague | 353/28 |
| 2010/0048242 A1 | 2/2010 | Rhoads et al. | |
| 2010/0082629 A1 | 4/2010 | Davis et al. | |
| 2010/0083373 A1 | 4/2010 | White et al. | |
| 2010/0118123 A1 | 5/2010 | Freedman et al. | |
| 2010/0153457 A1 | 6/2010 | Grant | |
| 2010/0199232 A1* | 8/2010 | Mistry et al. | 715/863 |
| 2011/0154233 A1* | 6/2011 | Lamarca et al. | 715/764 |
| 2011/0154249 A1* | 6/2011 | Jang et al. | 715/781 |
| 2011/0154266 A1 | 6/2011 | Friend et al. | |
| 2011/0173204 A1* | 7/2011 | Murillo et al. | 707/741 |
| 2011/0213664 A1 | 9/2011 | Osterhout et al. | |
| 2012/0162254 A1 | 6/2012 | Anderson et al. | |
| 2012/0242800 A1 | 9/2012 | Ionescu et al. | |
| 2012/0320158 A1* | 12/2012 | Junuzovic et al. | 348/46 |
| 2013/0004016 A1 | 1/2013 | Karakotsios et al. | |
| 2013/0044912 A1 | 2/2013 | Kulkarni et al. | |
| 2013/0050069 A1 | 2/2013 | Ota | |
| 2013/0050258 A1 | 2/2013 | Liu et al. | |
| 2013/0135199 A1* | 5/2013 | Perski et al. | 345/156 |
| 2013/0174213 A1 | 7/2013 | Liu et al. | |
| 2013/0207962 A1 | 8/2013 | Oberdorfer et al. | |
| 2013/0272574 A1 | 10/2013 | Cohen | |
| 2013/0285894 A1 | 10/2013 | Marti | |
| 2013/0311329 A1 | 11/2013 | KKnudson et al. | |

FOREIGN PATENT DOCUMENTS

| | | | |
|---|---|---|---|
| JP | 2001211372 A | 8/2001 |
| JP | 2005313291 A | 11/2005 |
| JP | 2007142495 A | 6/2007 |
| JP | 2007323084 A | 12/2007 |
| JP | 2009295031 A | 12/2009 |
| JP | 2010072025 A | 4/2010 |
| JP | 2013541747 A | 11/2013 |
| WO | 2012011044 A1 | 1/2012 |

OTHER PUBLICATIONS

"iGesture—FAQ" at "http://igesture.org/faq.html" as available on May 21, 2012, 2 pages.
"iGesture: A General Gesture Recognition Framework" at "http://igesture.org/index.html" as available on May 21, 2012, 1 page.
"User Guide: iGesture Workbench" at "http://igesture.org/userguide_tool.html" as available on May 21, 2012, 6 pages.
"WIIGEE, A Java-based gesture recognition library for the Wii remote" at "http://www.wiigee.org/development/background/background.html" as available on Apr. 9, 2012, 3 pages.
Shindo, T., "[ISSCC] Samsung's CMOS Sensor Takes Range, RGB Images at Same Time," at "http://techon.nikkeibp.co.jp/english/NEWS_EN/20120225/206010/", Tech-On! Tech News—Straight from Asia, Nikkei Business Publications, Inc., Feb. 25, 2012, 3 pages.
Wu, T.-P. et al., "Interactive Normal Reconstruction from a Single Image," SIGGRAPH 2007 / ACM Transactions on Graphics (ToG), vol. 26, No. 3, Aug. 2007, 9 pages.
"Range imaging" at "http://en.wikipedia.org/wiki/Range_imaging" as available on May 17, 2012, 3 pages.
Winkelbach, S. et al., "Shape from Single Stripe Pattern Illumination," published in Luc Van Gool (ed.): Pattern Recognition, Lecture Notes in Computer Science 2449, Springer 2002, pp. 240-247.
Mistri, P. et al. "WUW—Wear Ur World—A wearable Gestural Interface," CHI 2009, Apr. 4-9, 2009, Boston, MA, USA, 6 pages.
Greaves A. et al."Picture Browsing and Map Interaction using a Projector Phone" MobileHCI 2008, Sep. 2-5, 2008, Amsterdam, the Netherlands, 4 pages.
Mitra S. et al. "Gesture Recognition: A Survey", IEEE transactions on Systems, Man, and Cybernetics—Part C: Applications and Reviews, vol. 37, No. 3, May 2007, 14 pages.
Kawasaki H. et al , "Dynamic scene shape reconstruction using a single structured light pattern", IEEE Conference on Computer Vision and Pattern Recognition, 2008, 8 pages.
Li Zhang et al.,"Rapid Shape Acquisition Using Color Structured Light and Multi-pass Dynamic Programming" in Proceedings of the 1st International Symposium on 3D Data Processing, Visualization, and Transmission (3DPVT), Padova, Italy, Jun. 19-21, 2002, pp. 24-36.
Pece F. et al.,"Three Depth-Camera Technologies Compared", First Beaming Workshop, Barcelona, 2011, 2 pages.
Rautaray S. S. et al."A Vision based Hand Gesture Interface for Controlling VLC Media Player" published in the International Journal of Computer Applications, vol. 10, No. 7, Nov. 2010, 6 pages.
Mangan A. P. et al. "Partitioning 3D Surface Meshes Using Watershed Segmentation" in IEEE Transactions on Visualization and Computer Graphics, vol. 5,No. 4, Oct.-Dec. 1999, 14 pages.
Jean-Yves Bouguet, "Camera Calibration Toolbox for Matlab", available at "http://www.vision.caltech.edu/bouguetj/calib_doc/", last updated Jul. 9, 2010, 4 pages.
Werghi N. "Robust 3D Object Registration Based on Pairwise Matching of Geometric Distributions", International Journal of Computers and Applications, vol. 31, No. 1, 2009, 8 pages.
Barakonyi, I. et al. Ubiquitous Animated Agents for Augmented Reality, IEEE, 2006, pp. 145-154.
"Scale-Invariant Feature Transform" at "http://en.wikipedia.org/wiki/scaleinvariant_feature_transform" as available on Apr. 9, 2012, 15 pages.
"Camera Calibration Toolbox for Matlab" at "http://www.vision.caltech.edu/bouguetj/calib_doc/" as available on Apr. 10, 2012, 4 pages.
Elmezain, M. et al. "A Robust Method for Hand Gesture Segmentation and Recognition Using Forward Spotting Scheme in Conditional Random Fields" in International Conference on Pattern Recognition, 2010, 4 pages.
"HandVu: Vision-based Hand Gesture Recognition and User Interface" at "http://www.movesinstitute.org/~kolschlHandVu/HandVu.html#documentation" as available on Apr. 9, 2012, 4 pages.
International Search Report and Written Opinion—PCT/US2012/046817—ISA/EPO—Feb. 22, 2013, 12 pages.
Lowe, D. G. "Object Recognition from Local Scale-Invariant Features", Proceedings of the International Conference on Computer Vision, Sep. 1999, vol. 2, pp. 1150-1157.
Raskar, R. et al. "The Office of the Future: A Unified Approach to Image- Based Modeling and Spatially Immersive Displays", Computer Graphics Proceedings, Annual Conference Series, SIGGRAPH'98, Orlando, Florida, Jul. 19-24, 1998, pp. 1-10.
Raskar, R. et al. "iLamps: Geometrically Aware and Self-configuring Projectors", Appears in ACM SIGGRAPH 2003 Conference Proceedings, 2003, pp. 1-10.
Signer, B. et al. "iGesture: A General Gesture Recognition Framework", In Proceedings ICDAR '07, 5 pages.
Tracking Your Fingers with the Wiimote at http://johnnylee.net/projects/wii/ as available on Apr. 9, 2012, 2 pages.
Viola, P. et al. "Robust Real-Time Face Detection", International Journal of Computer Vision, 57(2), 2004, pp. 137-154.
Viola, P. et al. "Robust Real-time Object Detection," In the Second International Workshop on Statistical and Computational Theories of Vision—Modeling, Learning, Computing, and Sampling, Vancouver, Canada, Jul. 13, 2001, 25 pages.
"Viola-Jones object detection framework" at"http://en.wikipedia.org/wiki/Viola%E2%80%93Jones_object_detection_framework"as available on Apr. 9, 2012, 3 pages.
"Introducing Kinect for Xbox 360", as available at http://www.xbox.com/en-US/kinect, Aug. 19, 2011, 4 pages.

(56) References Cited

OTHER PUBLICATIONS

Boykov Y., et al., "Graph Cuts in Vision and Graphics: Theories and Applications," Chapter "Math. Models of Computer Vision: The Handbook," Paragios, Ed., 2007, pp. 100-118.

Dung L., et al., "Fast Hand Feature Extraction Based on Connected Component Labeling, Distance Transform and Hough Transform," Journal of Robotics and Mechatronics, 2009, vol. 21(6), pp. 726-727.

Ghobadi S.E., et al., "Hand Segmentation Using 2D/3D Images," Proceedings of Image and Vision Computing New Zealand, Dec. 2007, pp. 64-69.

Greig D.M., et al., "Exact Maximum A Posteriori Estimation for Binary Images," Journal of the Royal Statistical Society, Series B (Methodological), 1989, vol. 51 (2), pp. 271-279.

Hearst M.A., "Support Vector Machines," Trends and Controversies, IEEE Intelligent Systems, Jul./Aug. 1998, vol. 13 (4), pp. 18-28.

Lowe D.G., "Distinctive Image Features from Scale-Invariant KeyPoints," International Journal of Computer Vision, 2004, vol. 60 (2), pp. 91-110.

Mbed, "Mbed NXP LPC1768," 2009, Retrieved date on Sep. 18, 2015, Retrieved from the Internet URL: http://mbed.org/nxp/lpc1768/, 2 pages.

Sanchez-Nielsen E., et al., "Hand Gesture Recognition for Human-Machine Interaction," Journal of WSCG, 2004, Feb. 2-6, 2003, vol. 12, No. 1-3, 8 pages, ISSN 1213-6972.

SparkFun: "SparkFun Bluetooth Modem—BlueSMiRF Gold," WRL-12582 ROHS, Date believed to be prior to Jul. 13, 2012, Retrieved date on Sep. 18, 2015, Retrieved from the Internet URL: https://www.sparkfun.com/products/12582, 5 Pages.

Viola P., et al., "Rapid Object Detection using a Boosted Cascade of Simple Features," IEEE Conference on Computer Vision and Pattern Recognition, 2001, vol. 1, pp. I-511 to I-518.

Zhang Z., "A Flexible New Technique for Camera Calibration", Microsoft Technical Report, MSR-TR-98-71, IEEE Transactions on Pattern Analysis and Machine Intelligence, 2000, vol. 22 (11), pp. 1-21.

\* cited by examiner

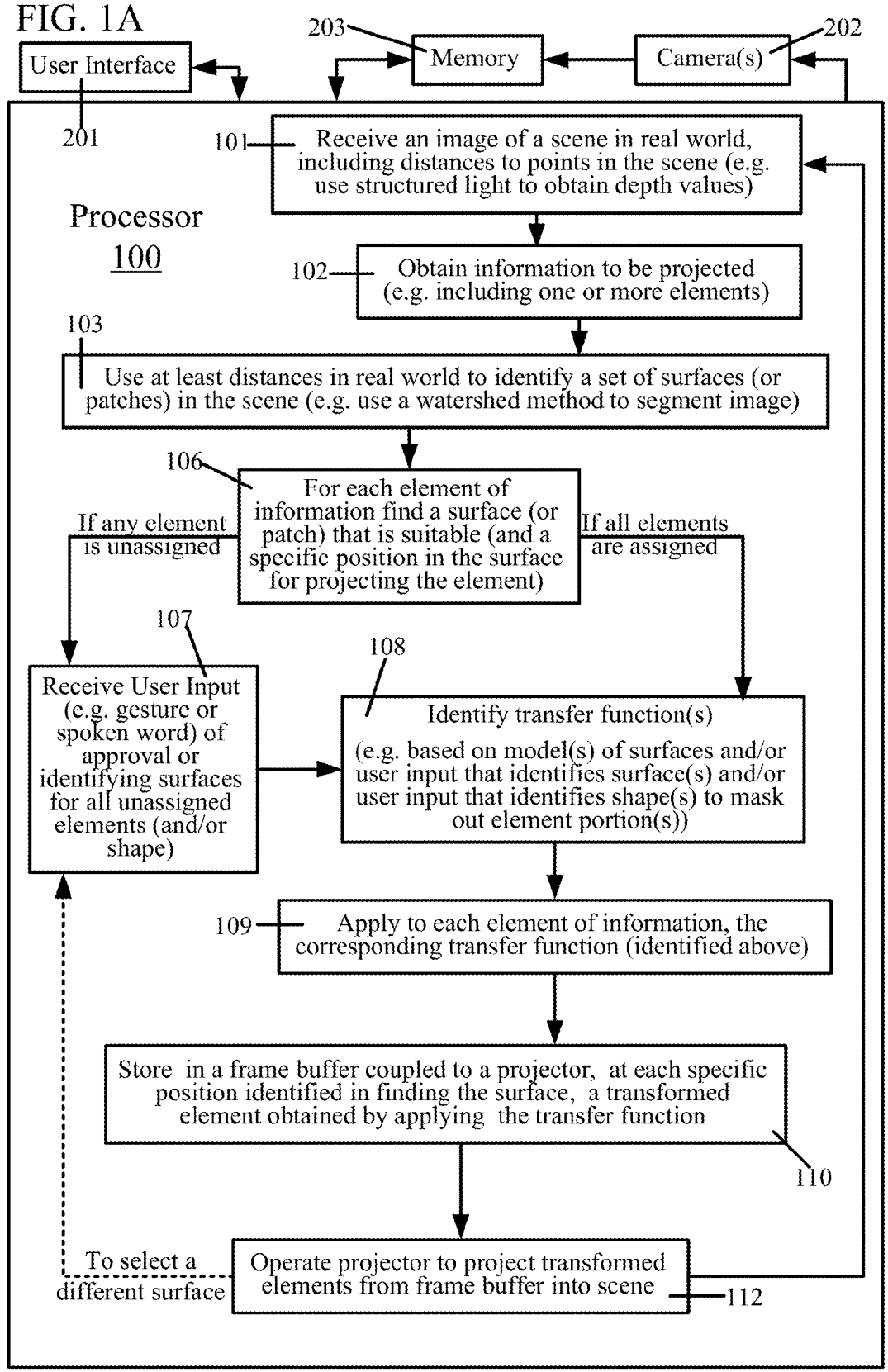

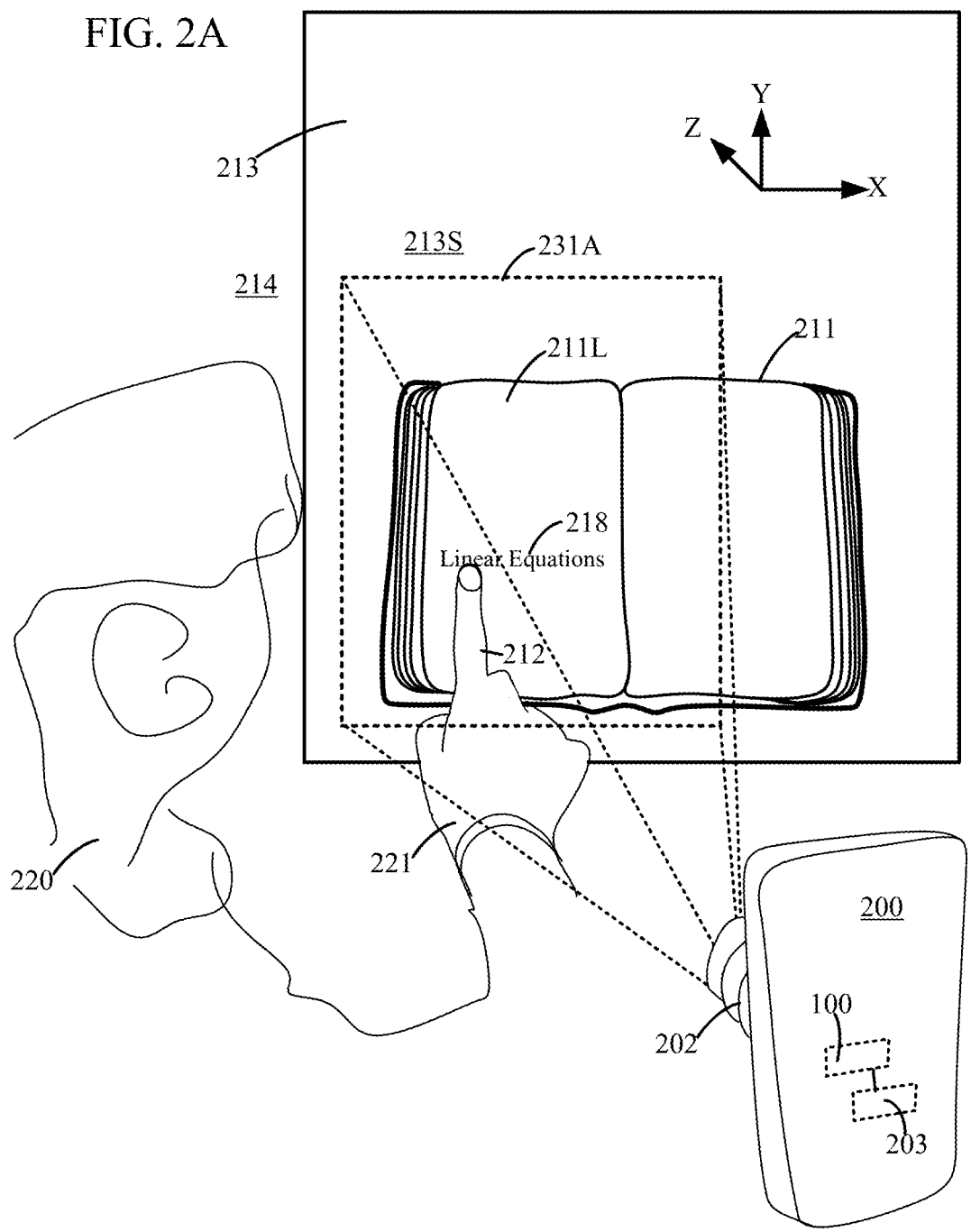

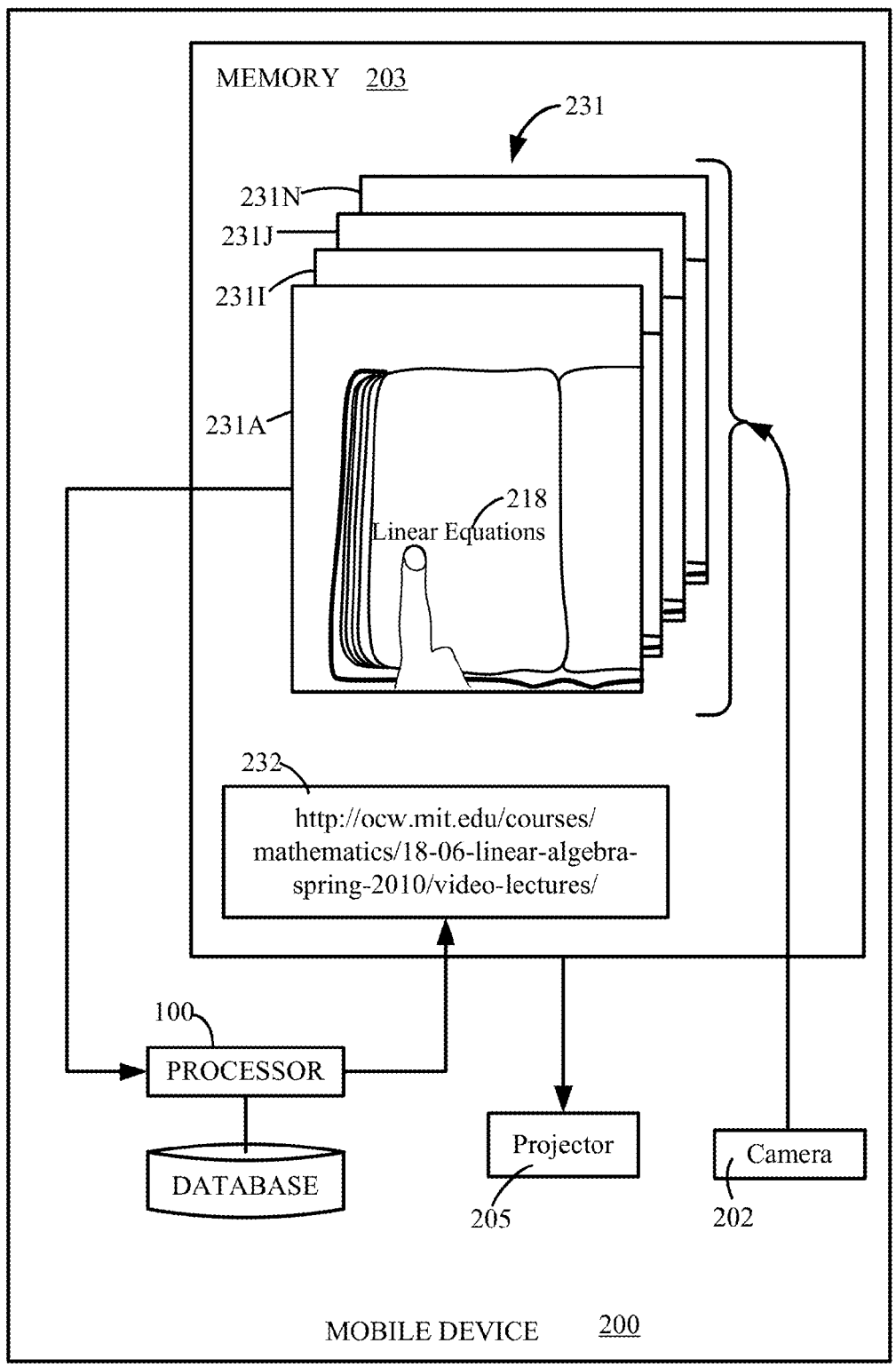

DYNAMIC SELECTION OF SURFACES IN REAL WORLD FOR PROJECTION OF INFORMATION THEREON

CROSS-REFERENCE TO PROVISIONAL APPLICATION

This application claims priority under 35 USC §119 (e) from U.S. Provisional Application No. 61/525,628 filed on Aug. 19, 2011 and entitled "Projection of Information Onto Real World Objects or Adjacent Thereto", which is assigned to the assignee hereof and which is incorporated herein by reference in its entirety.

CROSS-REFERENCE TO RELATED APPLICATIONS

This application is also related to U.S. application Ser. No. 13/549,339, filed concurrently herewith, entitled "Use Of Association Of An Object Detected In An Image To Obtain Information To Display To A User" which is assigned to the assignee hereof and which is incorporated herein by reference in its entirety.

BACKGROUND

It is well known to use a projector to project information for display to a user. For details on such prior art, see an article by Mistri, P., Maes, P., Chang, L., entitled "WUW—Wear Ur World—A wearable Gestural Interface," CHI 2009, Apr. 4-9, 2009, Boston, Mass., USA, 6 pages, that is incorporated by reference herein in its entirety.

Projection of information as described above raises several issues, such as lighting conditions. Several such issues are addressed by use of Time of Flight cameras, e.g. as described in the article entitled "Picture Browsing and Map Interaction using a Projector Phone" by Andrew Greaves, Alina Hang, and Enrico Rukzio, MobileHCI 2008, Sep. 2-5, 2008, Amsterdam, the Netherlands, 4 pages, that is incorporated by reference herein in its entirety. For additional information on such background on identifying hand gestures, see Mitra and Acharya, "Gesture Recognition: A Survey", IEEE transactions on Systems, Man, and Cybernetics—Part C: Applications and Reviews, Vol. 37, No. 3, May 2007, 14 pages that is incorporated by reference herein in its entirety.

In prior art, information may be projected on to a three-dimensional object, as described in, for example, U.S. Pat. No. 7,905,610 by Shapiro, which is incorporated by reference herein in its entirety. Specifically, Shapiro states in column 4, lines 20-26 that an "image may be pre-distorted based on three-dimensional information, environmental information, etc. See operation 310. In one embodiment, the pre-distortion may involve an inverse model of the three-dimensional object while calculating the image to be projected."

Use of Shapiro's method appears to require user involvement, as described in, for example, column 4, lines 27-34 which state "As yet another option, the user may optimally position the projector and the three-dimensional object at this point. This may be accomplished, for example, by projecting a marker (e.g. cross-hair, etc.) indicating a center of the image that will subsequently be projected. To this end, the marker may be manually aligned with a center of the three-dimensional object, by physically maneuvering the projector and/or three-dimensional object."

When physically maneuvering, it appears that Shapiro's user is manually selecting an object's surface on to which an image is to be projected, and manually aligning that selected surface to the projector. Thus, what is needed is a method to automatically select a surface in a scene of real world, for projection of information as described below.

SUMMARY

One or more devices capture a scene of real world, and process one or more image(s) (also called "depth images") of the scene, which include a plurality of distances to points in the real world. The distances are used to automatically identify a set of surfaces in the real world that have been imaged in the depth image(s). Then, the one or more devices check whether a surface in the set is suitable for display of an element of information to be projected. In response to finding that the surface is suitable, a transform function is automatically identified, to use the surface, followed by automatic application of the transform function to the element of the information. Then, a transformed element which results from automatically applying the transform function is stored in a frame buffer coupled to a projector, at a specific position in the frame buffer identified during the checking.

BRIEF DESCRIPTION OF THE DRAWING

FIG. 1A illustrates in a high-level flow chart, acts performed by a processor 100 of some embodiments, to automatically obtain and project information into a scene of real world.

FIG. 2A illustrates a scene 214 in real world of one example, imaged by camera 202 of mobile device 200 for use in projection of information adjacent to an object 211 in the real world, in certain embodiments.

FIG. 2B illustrates, in a high-level block diagram, a processor 100 coupled to a memory 203 in mobile device 200 of some embodiments, with memory 203 storing frames 231A-231N of a video 231 (also called input video) generated by camera 202 from the exemplary scene 214 of FIG. 2A, and memory 203 storing a request 232 for retrieval of information to be displayed by projection.

DETAILED DESCRIPTION

Figure 1B:
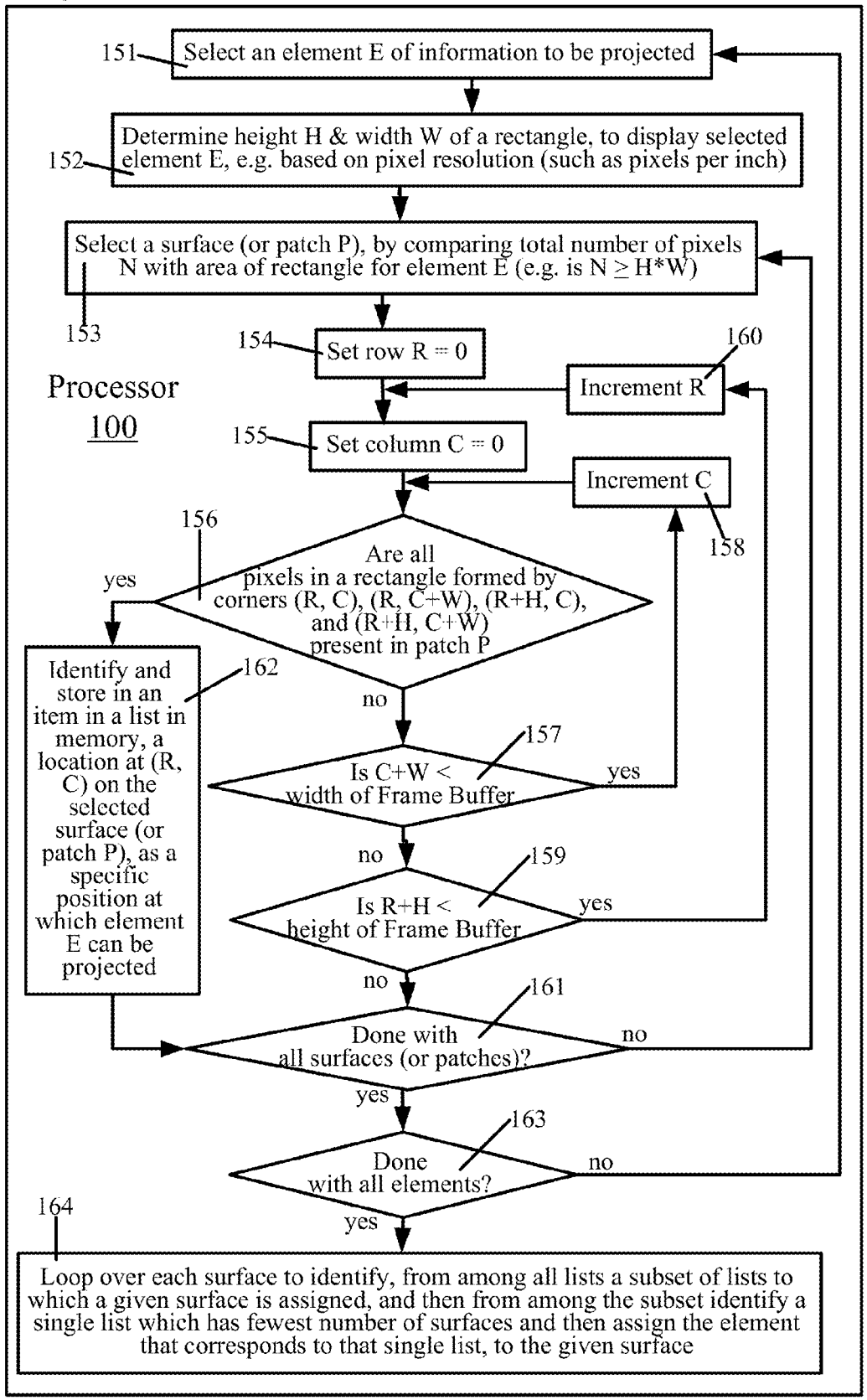
FIG. 1B illustrates in a low-level flow chart, acts performed by a processor 100 of some embodiments, to perform act 106 in FIG. 1A.

In accordance with the described embodiments, one or more devices use one or more cameras (and/or other devices such as a projector) to receive information (e.g. an image) from a scene in real world and store the received information in a memory. Several such devices include a processor 100 (FIG. 1A) that is coupled to a non-volatile memory 203 to execute software (i.e. computer instructions) stored in memory 203, to receive and process information captured by camera(s) 202.

At least one camera 202 (FIG. 1A) is operated in some embodiments so that processor 100 receives (as shown by act 101 in FIG. 1A) via memory 203, a two dimensional array of color values of an image 231A (FIG. 2A) of a scene 214 in real world (FIG. 2A), and optionally another two dimensional array of depth values (also called range values) which are indicative of distances of points on surfaces 213S, 211L in the real world, from camera 202. In some embodiments, camera 202 (FIG. 1A) is a depth camera (also called range camera) that directly generates and supplies to processor 100 two sets of values namely color values and depth values. However, a specific manner in which depth values are obtained by processor 100 can be different, depending on the embodiment, and some illustrative embodiments are described next.

Figure 4:
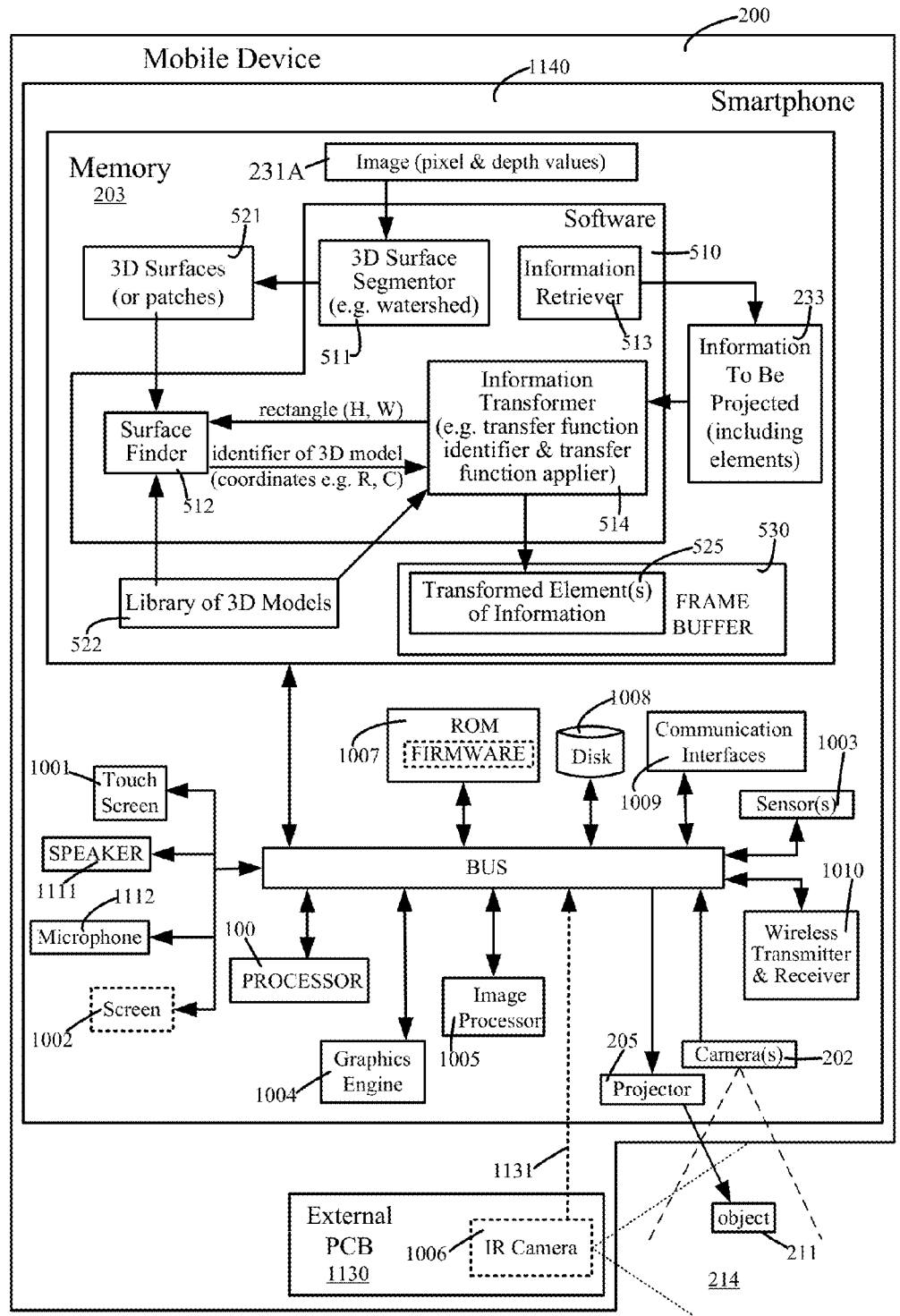
FIG. 4 illustrates, in a high-level block diagram, a mobile device 200 of several embodiments.

In some embodiments, depth values are obtained by operating a projector 205 (FIG. 4) to illuminate a scene with light that is encoded with positional information (also called "structured light", and abbreviated "SL"), and operating a camera 202 (FIG. 4) to capture one or more images of the scene 214 while illuminated with structured light from projector 205 (FIG. 4). In such embodiments, act 101 (FIG. 1A) to receive an image of color values and depth values may be performed as described in, for example, an article entitled "Dynamic scene shape reconstruction using a single structured light pattern" by Hiroshi Kawasaki et al, IEEE Conference on Computer Vision and Pattern Recognition, 2008 (CVPR 2008), 8 pages that is incorporated by reference herein in its entirety. In other embodiments, act 101 may be performed as described in, for example, an article entitled "Rapid Shape Acquisition Using Color Structured Light and Multi-pass Dynamic Programming" by Li Zhang et al, in Proceedings of the 1st International Symposium on 3D Data Processing, Visualization, and Transmission (3DPVT), Padova, Italy, Jun. 19-21, 2002, pp. 24-36 that is incorporated by reference herein in its entirety.

Alternative embodiments of act 101 may use other methods to obtain depth values, e.g. as described in an article entitled "Three Depth-Camera Technologies Compared" by F. Pece et al, First BEAMING Workshop, Barcelona, 2011, 2 pages that is also incorporated by reference herein in its entirety. In a specific example illustrated in FIG. 2A, an image 231A is captured by camera 202 as one of several images in a sequence of frames of an input video 231 generated by camera 202 imaging scene 214. Scene 214 in the example of FIG. 2A includes an object 211 in the form of a book that has been laid open on a surface 213S of a table 213. In scene 214, a user 220 is pointing to a line of text on a left page 211L of book 211 by use of an index finger 212 of user's hand 221. In some embodiments, a sequence of images 231A-231N is created by camera 202 at a predetermined rate, e.g. 30 frames/second and automatically stored in memory 203 (FIG. 1A) as a video that has been captured from scene 214, e.g. for use in time-of-flight calculations to obtain depth values as camera 202 is moved relative to scene 214.

In some embodiments, in an act 102 (FIG. 1A), processor 100 obtains information 233 (FIG. 2C) that is to be projected into scene 214. A specific manner in which information 233 is obtained in act 102 can be different depending on the embodiment. In some embodiments, information 233 is obtained in act 102 based on an instruction received via a user interface 201 (FIG. 1A), e.g. from a microphone (which may supply an audio signal carrying the words "Linear Equations" spoken by a user), or from a keyboard (which may supply a series of key strokes that form the character string for the words "Linear Equations" typed by the user).

In other embodiments, information 233 is obtained differently, e.g. by processor 100 using color values of image 231A to automatically obtain information 233 as follows. Specifically, in some embodiments, information 233 is obtained in act 102 based on recognition within an image 231A (FIG. 2A) by processor 100 of a hand gesture, such as index finger 212 outstretched in human hand 221 of human 220, pointing to text 218 printed on an object 211 (such as a book), as illustrated in FIG. 2A.

Hand gestures may be recognized by processor 100 being suitably programmed in any manner apparent to the skilled artisan, e.g. as described in an article entitled "A Vision based Hand Gesture Interface for Controlling VLC Media Player" by Rautaray et al. published in the International Journal of Computer Applications, vol. 10, no. 7, November 2010, 6 pages that is incorporated by reference herein in its entirety. Other embodiments of processor 100 may identify hand gestures as described by, for example, Mitra and Acharya, in an article entitled "Gesture Recognition: A Survey", IEEE transactions on Systems, Man, and Cybernetics—Part C: Applications and Reviews, Vol. 37, No. 3, May 2007, 14 pages that has been incorporated by reference above.

Hence, in an example illustrated in FIG. 2B, a two dimensional array of color values (not shown) of image 231A is automatically processed by processor 100 in act 102 (FIG. 1A) to identify a region of text 218 that contains a character string "Linear Equations" printed on left page 211L and pointed to by user 220 (FIG. 2A) as captured in image 231A (FIG. 2B).

In act 102, regardless of the type of user interface 201 through which information 233 has been identified, processor 100 responds to the identification by automatically generating a request 232 (FIG. 2B) for a video on "Linear Algebra"

available on the Internet. Request 232 is stored in memory 203 and (in some embodiments after user approval) used to obtain a video 233 (also called output video) which is stored in memory 203 (FIG. 2C) and used as information 233 to be projected. Certain illustrative embodiments of how information 233 is obtained in act 102 are described in U.S. application Ser. No. 13/549,339, filed concurrently, entitled "Use Of Association Of An Object Detected In An Image To Obtain Information To Display To A User" which is incorporated by reference above.

Although information 233 that is obtained in act 102 of some embodiments has been described above as an output video 233 which constitutes a single element, in other embodiments the information 233 may include multiple elements (e.g. in a web page) that are independent of one another and can be projected on different surfaces. Such multiple elements of information 233 may be identified in tables and/or sections defined in a web page expressed in HTML using tag <table> for example, to identify different blocks of text and/or graphics in information 233.

Referring to FIG. 1A, processor 100 is additionally programmed to perform an act 103 (at any time before, during or after act 102 described above), to use the image's depth values to identify a set of surfaces 213S, 211L (FIG. 2A) in the scene 214 in real world. The set of surfaces 213S, 211L may be identified in act 103 (FIG. 1A) by segmentation of image 231A into regions with a consistent curvature, so that when information 233 is projected, the information 233 is well displayed within each region. A specific manner in which surfaces are identified in act 103 can be different, depending on the embodiment.

In some embodiments, act 103 (FIG. 1A) uses depth values as described in, for example, an article entitled "Partitioning 3D Surface Meshes Using Watershed Segmentation" by Alan P. Mangan et al, IEEE Transactions on Visualization and Computer Graphics, Vol. 5, NO. 4, October-December 1999, pp 308-321 that is incorporated by reference herein in its entirety. In some embodiments, camera 202 is calibrated, before performing act 101 (described above), e.g. as described in an article entitled "Camera Calibration Toolbox for Matlab" by Jean-Yves Bouguet, 4 pages, last updated Jul. 9, 2010 that is incorporated by reference herein in its entirety. This article is available at a website identified in a string obtained by replacing "%" with "/" and replacing "#" with "." in the following: "http:%% www#vision#caltech#edu% bouguetj%calib_doc%.

Image 231A may be segmented using different techniques in different embodiments. In some embodiments, no depth values are obtained, and surfaces in scene 214 are identified from a sequence of two dimensional images by use of a Hough transform, as described in, for example, U.S. Pat. No. 4,731,860, entitled "Method for identifying three-dimensional objects using two-dimensional images" by Wahl that is incorporated by reference herein in its entirety.

Hence, in several embodiments, image 231A is automatically segmented by processor 100 in act 103 (FIG. 1A) to identify a set of surfaces. In the example illustrated in FIGS. 2A and 2B, a set of depth values of image 231A are copied by processor 100 to storage locations 234 (FIG. 2C) of memory 203, followed by segmentation to identify surfaces of object 211 in real world (FIG. 2A) that correspond to regions 211A, 211B, 212A, 212B, 212C and 212S in image 234 (FIG. 2C). For example, a surface of page 211L in FIG. 2A corresponds to region 211A in image 234 in FIG. 2C. Note that for convenience, the same reference numerals are used to refer to regions in image 231A and corresponding surfaces in scene 214, in FIGS. 2B and 2A respectively.

After act 103, many embodiments of processor 100 performs an act 106 for each element in the information obtained in act 102, to find a surface (or patch P) that is suitable for the element. A suitability test performed in act 106 can be different, depending on the embodiment, although several embodiments test suitability depending on the number of factors, such as size of the surface, contiguousness of points in the surface, curvature of the surface etc. A surface may be found to be suitable in act 106 of some embodiments, when the element of information to be displayed does not span across a boundary of the surface, or when the element does not wrap around in an irregular manner.

In an example illustrated in FIGS. 2A-2C, output video 233 is a single element in the information to be projected in act 102. Accordingly, processor 100 evaluates all surfaces 211A, 211B, 212A, 212B, 212C and 212S from a set identified in act 103, for suitability to display output video 233. During such evaluation, each of regions 211C, 211B, 212B and 212A are found to be not suitable to display output video 233, e.g. due to size. In this example, regions 213U and 211A may be found to be acceptable on completion of act 106.

In several such embodiments, on finding a surface (or patch P) that is suitable for an element, processor also identifies a specific position on the surface, at which the element is to be projected. The specific position identified in act 106 depends on several factors, such as the shape of the surface (e.g. rectangular, circular), and where the surface can completely enclose a rectangle in which the selected element is to be displayed.

In operation 106 if processor 100 is successful in finding surfaces for all elements, processor 100 goes to act 108 to identify one or more transform functions for the corresponding surfaces. The transform function is identified in act 108 to at least partially neutralize an effect of projection of information on the selected surface. But if processor 100 finds in act 106 that there is no surface suitable for any element of information, then processor 106 goes to act 107 to receive user input (described below).

Figure 2C:
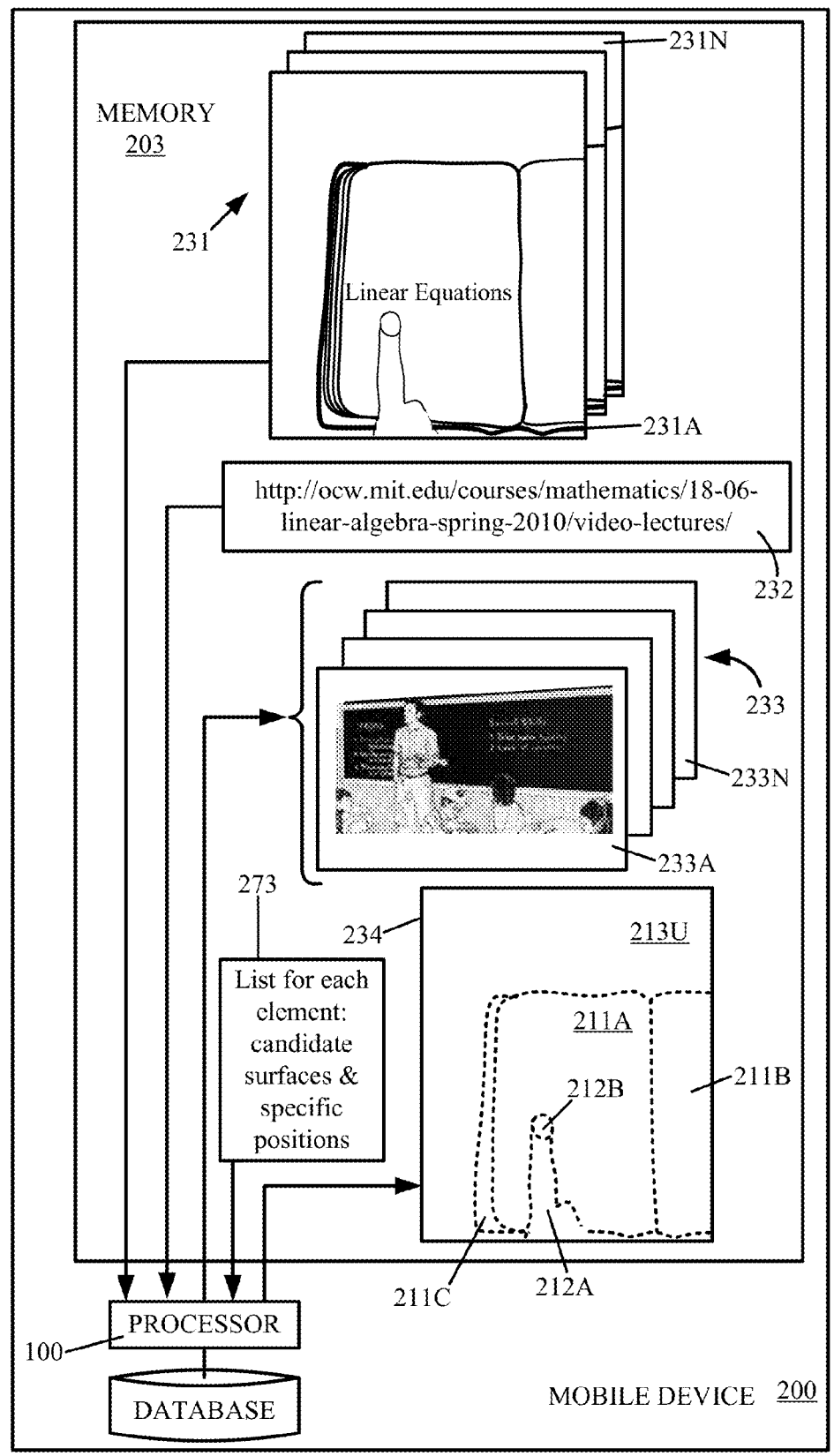
FIG. 2C illustrates, in a high-level block diagram similar to FIG. 2B, memory 203 storing information 233 obtained by use of request 232, and storage locations 234 storing an image of frame 231A segmented into patches 211A-211B, 212A-212C and 213S that correspond to surfaces in the exemplary scene 214 of FIG. 2A.
Figure 2D:
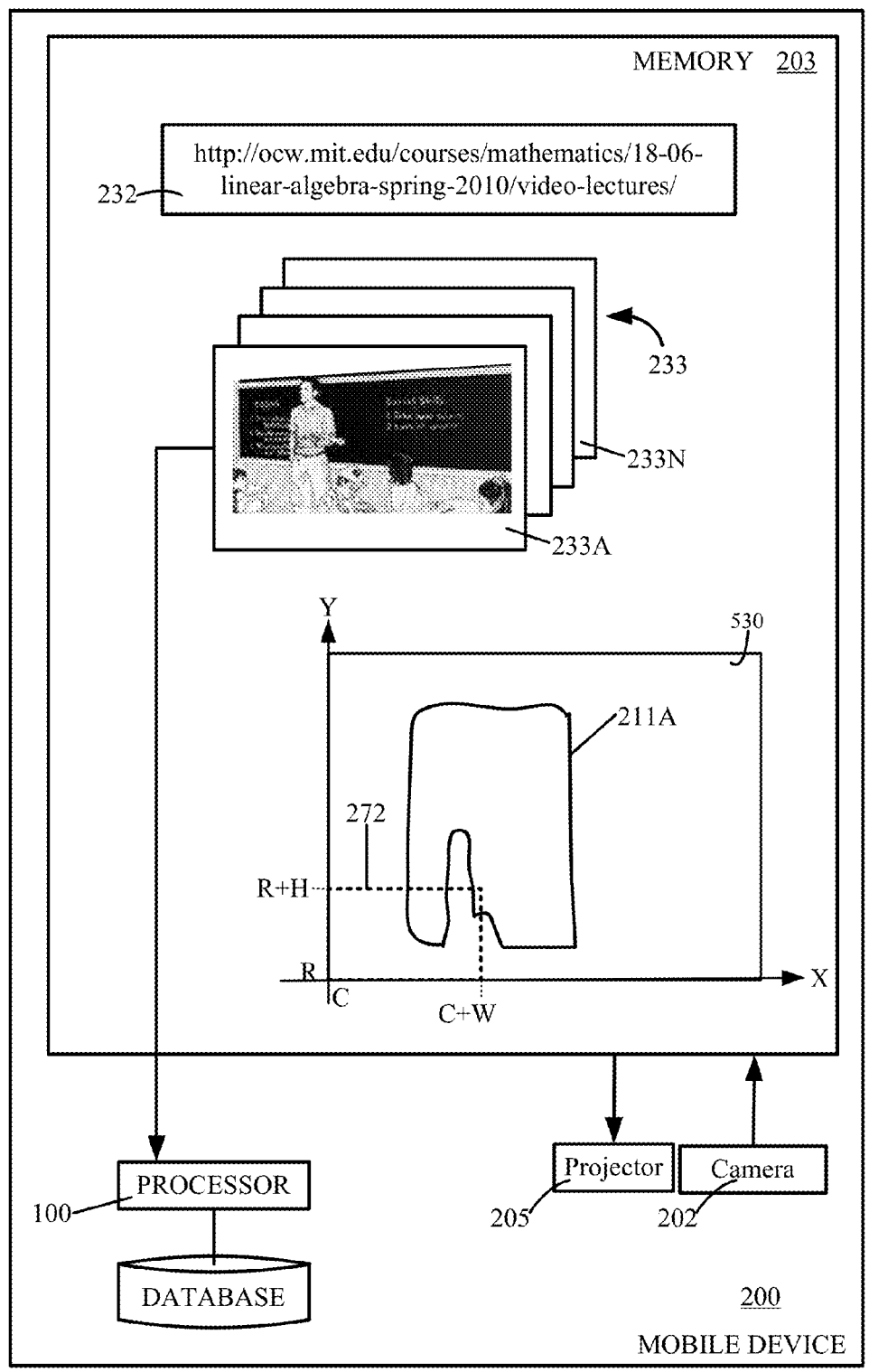
FIG. 2D is a high-level block diagram, similar to FIG. 2B, illustrating checking of whether or not a rectangle 299 (for projecting an element of information) can fit within an irregularly shaped patch 211A of FIG. 2C that corresponds to a surface of page 211L in FIG. 2A.
Figure 2E:
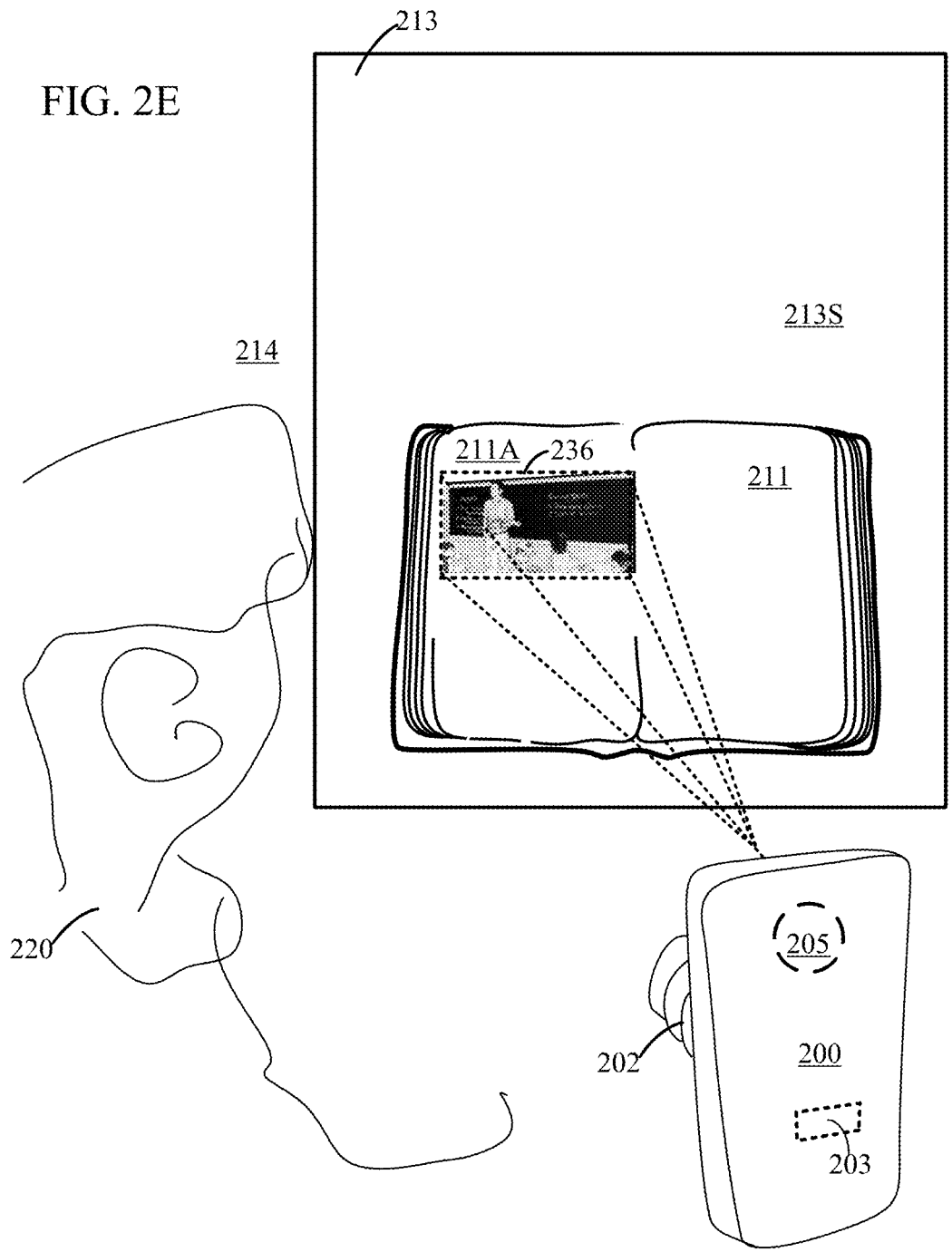
FIG. 2E illustrates the scene 214 of FIG. 2A into which information in the form of a video 236 is projected on to object 211 in the real world, by projector 205 of mobile device 200, in several embodiments.
Figure 2F:
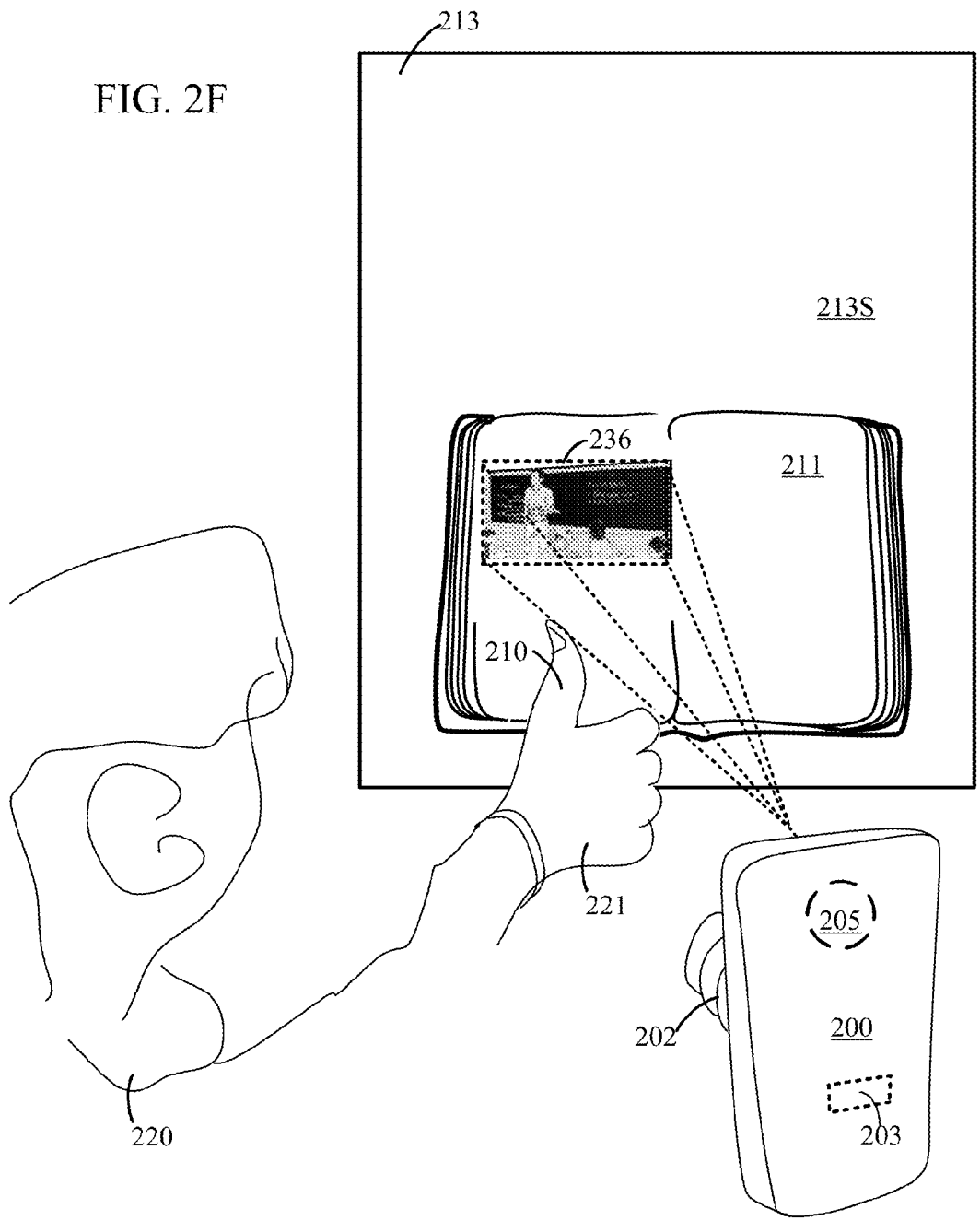
FIG. 2F illustrates scene 214 of FIG. 2E wherein user 220 stretches thumb 210 of hand 221, to make an approval gesture that is identified in an image by processor 100 as user input in act 107 of FIG. 1A.

For example, when surface 213S is planar and a corresponding planar transform is identified in act 108 by processor 100 for use in compensating for orientation and position (also called 'pose') of projector 205 in mobile device 200 relative to surface 213S. Such a planar transform may, for example, shorten a height of frame 233A of an output video 233 so that a transformed frame on projection is rendered appropriately as it gets physically elongated when incident on surface 213S in scene 214 of the real world, specifically at an angle θ relative to surface 213S which is not 90° (i.e. when video 236 is projected as shown in FIG. 2H at angle θ which is slanted rather than perpendicular to surface 213S).

In some embodiments, the transform function is identified in act 108 by performing matrix inversion on a two dimensional matrix which holds values that model a surface found to be suitable in act 106 (or alternatively a surface that is identified by user input in act 107). A model of values is identified in act 108, in any manner, e.g. based on comparing depth values of the surface with one or more models in a library of three dimensional (3D) models 522 (FIG. 4). In some embodiments, a model is selected in act 108 e.g. as described in an article entitled "Robust 3D Object Registration Based on Pairwise Matching of Geometric Distributions" by N. Werghi, 8 pages, published in 2009 in International Journal of Computers and Applications, Vol. 31, No. 1 that is incorporated by reference herein in its entirety.

Next, in act 109, processor 100 applies the transform function to the element of information, e.g. by performing matrix multiplication between the matrix of the transform function and a matrix of the element of information, to obtain a transformed element (of the information). Then, in act 110, processor 100 stores in memory 203, the transformed element of the information, specifically in a frame buffer 530 (FIG. 4) that is operatively coupled to a projector 205.

After act 110, processor 100 goes to act 112 to operate projector 205. On operation of projector 205, one or more transformed elements in frame buffer 530 is/are projected into scene 214. When a projection of the transformed element is incident on a selected surface (e.g. surface 211A in FIG. 2E) the selected surface 211A transforms the transformed element back, so that information rendered on surface 211A appears normal to human 220 (FIG. 2E).

Projection of a transformed element of information (such as video 236 in FIG. 2H) on to a three-dimensional surface may be performed in many embodiments in a manner similar or identical to, for example, (1) methods described by U.S. Pat. No. 7,905,610 granted to Shapiro (incorporated by reference above) and (2) methods described by US Publication 2004/0184013 by Raskar entitled "Projecting Warped Images Onto Curved Surfaces" that is incorporated by reference herein in its entirety.

On completion of act 112, processor 100 returns to act 101, thereby to perform the above-described acts once again. In some embodiments, processor 100 goes from act 112 to act 107 to receive user input. At this stage, while information is being projected, the user input received in act 107 may indicate approval of the projection, e.g. by the user saying "Good job" or making the hand gesture of thumbs up as illustrated in FIG. 2F, by stretching out thumb 210 of hand 221 in front of camera 202. When the user input indicates approval of the selected surface(s), processor 100 goes to act 108 (described above), to continue to use the selected surface(s) for information projection.

Figure 2G:
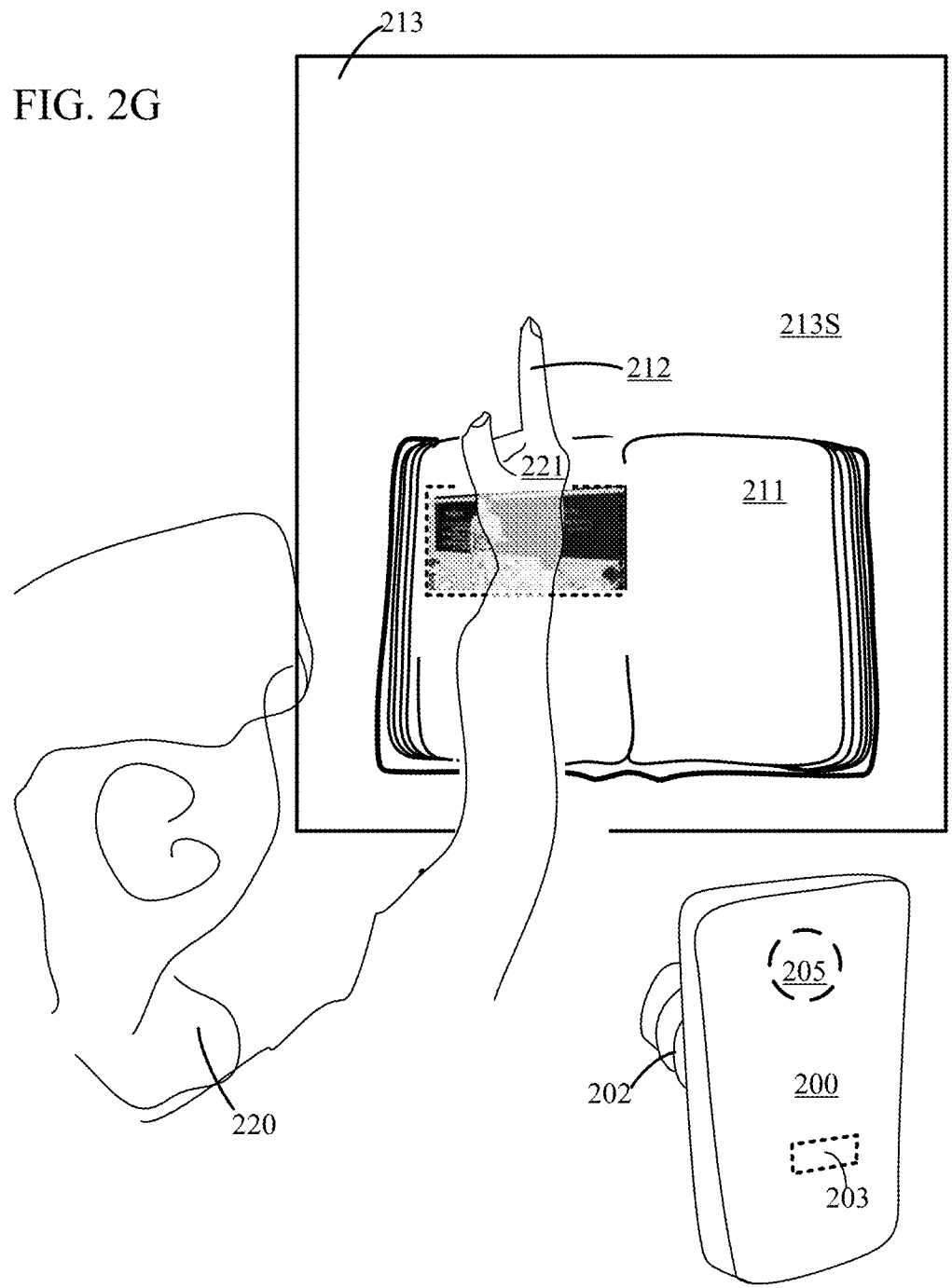
FIG. 2G illustrates scene 214 of FIG. 2E wherein user 220 stretches index finger 212 of right hand 221 to make a pointing gesture that is identified in an image by processor 100 as user input, indicative of surface 213S of table 213 to be used for projection.
Figure 2H:
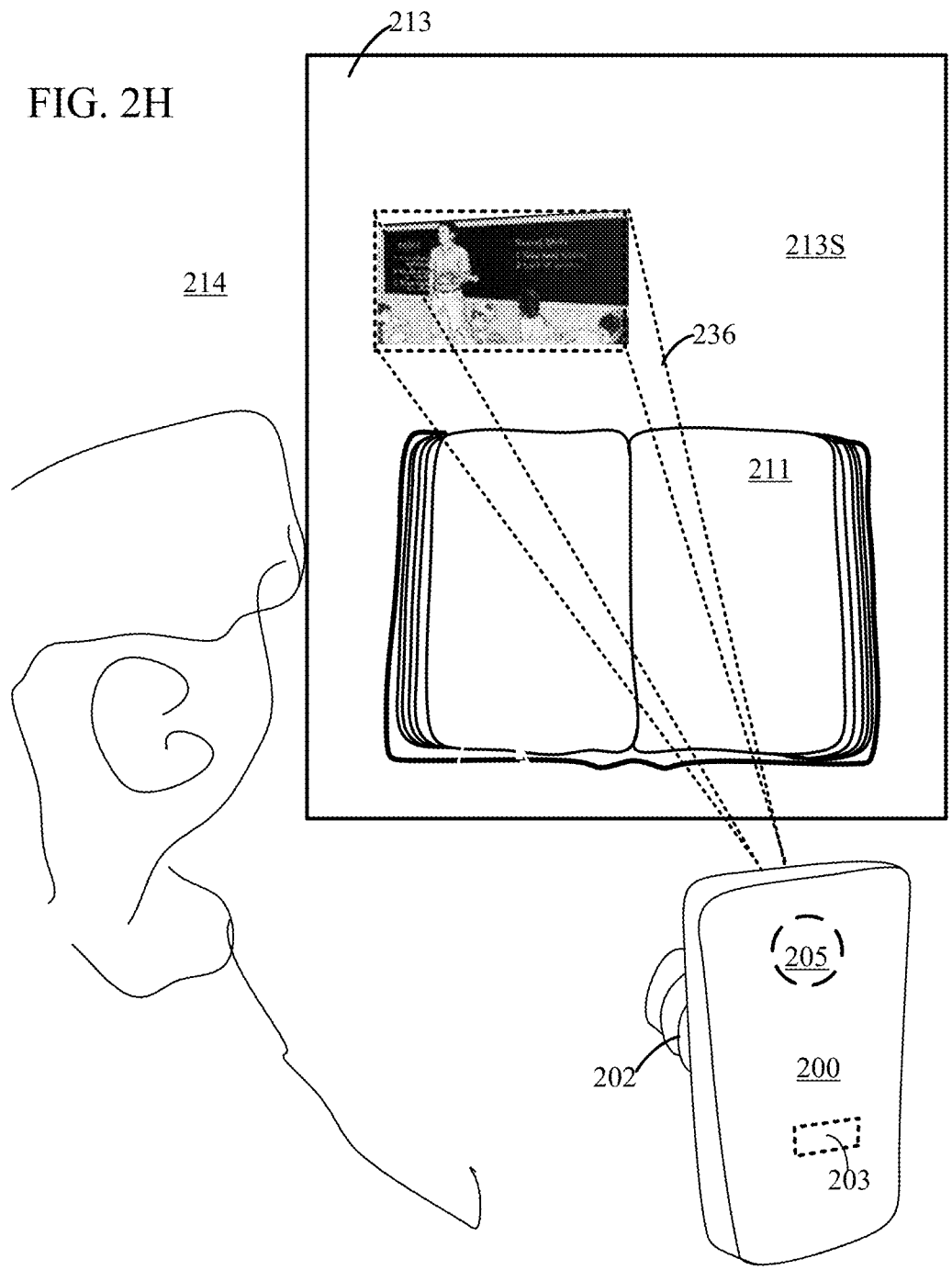
FIG. 2H illustrates scene 214 of FIG. 2E wherein transformed video 233 is projected on to surface 213S based on the user input illustrated in FIG. 2G.

The user input received in act 107 may indicate disapproval of the projection, e.g. by the user speaking the words "Not Good" (sensed by microphone 1112) or by the user making a hand gesture that points to another surface 213S, as illustrated in FIG. 2G by stretching out index finger 212 of hand 221 in front of (and captured by) camera 202. When the user input indicates disapproval of the selected surface(s) such as surface 211A in FIG. 2E, processor 100 again performs acts 108-110 (described above), this time using a different surface 213S identified by user input as illustrated in FIG. 2G, for information projection as illustrated in FIG. 2H. When the user input does not identify a different surface, but simply disapproves an automatically selected surface 211A, processor 100 automatically selects and begins using a different surface (e.g. surface 213S shown in FIG. 2H) that is found to be suitable for display of the information.

In some embodiments, in performing act 107, processor 100 receives user input identifying a shape. For example, the user may provide input indicative of a circle, by making a hand gesture. In response, the processor 100 uses the shape in the transform function, to mask out a portion of the element of information to be displayed. For example, if the hand gesture sensed via camera 202 is a circle, then processor 100 forms a mask of binary values, with the value of 1 being inside the circle and the value of 0 being outside the circle. The just described mask is used with a matrix for a 3D model of a selected surface, in act 109 to transform the element of information to be projected.

Some embodiments of processor 100 perform act 106 illustrated in FIG. 1A, as shown in FIG. 1B and described below. Specifically, in act 151, processor 100 selects an element E of the information to be projected and goes to act 152. In act 152, processor 100 determines height H and width W of a rectangle (such as rectangle 272 in FIG. 2D) in which the selected element E is to be displayed. The height H and width W are determined by processor 100 of some embodiments based on a predetermined resolution of an image in the element E. In other embodiments, height H and width W are determined by processor 100 based on font size of text in the element E. Then processor 100 goes to act 153.

In act 153, processor 100 selects a surface (or a patch P within the surface), by comparing the total number of pixels N in a region of the image corresponding to the selected surface (or patch P therein) with an area of a rectangle of height H and width W to be used to display the element i.e. H*W. If N≥H*W, then the surface (or patch P) is selected and otherwise not selected. The just-described comparison filters out any surfaces that may be too small in size to accommodate (e.g. completely enclose) a selected element E. On completion of act 153 if there is no surface that is sufficiently large for projection of element E, control transfers to act 164 (described below). When at least one surface is sufficiently large, that surface is selected in act 153, followed by looping over columns and rows of the frame buffer as described below, to check if the selected surface is suitable for projection of selected element E.

In some embodiments, processor 100 performs an act 154 to initialize the row R to the value 0 and performs act 155 to initialize the column C to the value 0, followed by a test in act 156 on the suitability of projecting the selected element E on the selected surface (or patch P), in a rectangle identified in a frame buffer by four corners (R, C), (R, C+W), (R+H, C) and (R+H, C+W), where W is width and H is height of the rectangle, as noted above. In such embodiments, an X-Y coordinate system in which the four corners are identified is positioned at a bottom left corner of the frame buffer 530 as illustrated in FIG. 2D. Accordingly, rectangle 272 is identified in frame buffer 530 in memory 203 in the above described manner, e.g. when element E is a video 233 (FIG. 2C), by use of its resolution by processor 100 to identify the above-described four corners.

Hence, in act 156, processor 100 performs one or more tests, e.g. test whether all pixels in the just-described rectangle which is to be used to project the element E are present in (e.g. contained within) a region of the image that corresponds to the surface. The just-described test for pixel availability filters out positions of rectangle 272 relative to an irregularly shaped surface 211A that may be unsuitable for projection, as shown in FIG. 2D (wherein corner (R, C) of rectangle 272 is not present in region 211A). Although one illustrative test is described and illustrated in act 156, any other such tests for suitability of a surface for projection of an element may be performed in act 156, depending on the embodiment, as will be readily apparent in view of this description.

If the answer in act 156 (FIG. 1B) is no, because projection in the above-described rectangle on the selected surface is found by any such tests to be not suitable, processor 100 loops using acts 157-160 to check if there is another relative position between rectangle 272 and the selected surface 211A, at which the selected surface 211A may still be suitable, for projection of the rectangle 272. Specifically, processor 100 checks in act 157 (FIG. 1B) if column C+W is less than the width of the frame buffer 530, and if so goes to act 158 to increment column C (thereby to move rectangle 272 in the positive X direction, to the right in FIG. 2D), and then returns to act 156 (described above). If the answer in act 157 is no, processor 100 goes to act 159 to check if the row R+H is less than the height of the frame buffer, and if so goes to act 160 to increment row R (thereby to move rectangle 272 in the positive Y direction, upwards in FIG. 2D) and then returns to act 155 (described above).

By repeatedly performing acts 154-160, processor 100 tests all possible positions of the rectangle 272 that are enclosed within the frame buffer 530, relative to a selected surface 211A, and when no position is found by testing in act 156 to be suitable, the answer in act 159 is no processor 100 goes to act 161 to check if all surfaces (or patches) have been tested and if not returns to act 153 to select another surface. If the answer in act 161 is yes, processor 100 goes to act 163 to check if all elements of the information to be projected have been processed and if not returns to act 151 to select another element, but if all elements have been processed then processor 100 goes to act 164 (described below).

In act 156, if the answer is yes, processor 100 goes to act 162 to identify and store in memory, in an item in a list 273 (FIG. 2C) in memory 203, the coordinates (R, C) of a location on the surface (or patch P), as a specific position at which the element E can be projected. Note that each item in the list 273 (FIG. 2C) is a candidate, for projection of element E, and one specific candidate is assigned for use in projection in act 164 described below.

Accordingly, in act 162, processor 100 associates a selected surface (or patch P) with the element E when one or more tests in act 156 are successful, and then processor 100 goes to act 161. In act 161 (as described above), processor 100 checks if all surfaces have been tested, and if the answer is no, returns to act 153 to test another surface or patch P. After looping via acts 161 and 153-156 and 162 and depending on the dimensions of element E and on surfaces in a set available for projection (as per act 103 in FIG. 1A), all surfaces that are tested and found suitable (as per act 156) for projection of element E are identified in a list maintained in memory 203 for element E, when the "yes" branch is taken from act 161.

Accordingly, in the example of FIG. 2C, the testing of act 156 is performed repeatedly, to associate with video 233, a list 273 that contains two items that identify the corresponding two surfaces 213U and 211A. Note that surfaces 213U and 211A constitute a subset, of the set of all surfaces 211A, 211B, 212A, 212B, 212C and 212S identified in act 103. Each of surfaces 213U and 211A is associated with video 233 in the list 273 for video 233 by act 162, with a specific position being identified in each element of the list to indicate where on the corresponding surface, video 233 can be projected. In the illustrative example of FIG. 2C, memory 203 holds only one list 273 as the information to be projected has only one element, and multiple lists are generated by processor 100 looping back from the "no" branch in act 163 to act 151, e.g. when the to-be-projected information includes multiple elements.

When all elements have been processed in act 163, the "yes" branch is taken by processor 100 going to act 164. In act 164, processor 100 assigns a specific surface for projection of each element E, based on lists in which all candidate surfaces were identified by act 162 for each element E. Specifically, in act 164, processor 100 loops over each surface (or patch P) to identify, from among all lists a subset of lists to which a given surface is assigned, and then from among the subset identify a single list which has fewest number of surfaces and then assigns an element corresponding to that single list, to the given surface. For example, if surface 211A has only one element 233 associated with it, then element 233 is assigned to surface 211A in act 164 and this surface 211A is then removed from all lists, followed by identifying another surface using the same process. On completion of act 164, when all surfaces have been assigned to receive the projection of corresponding elements of the information, any element that remains unassigned is not rendered in frame buffer 530 and not projected in some embodiments while alternative embodiments notify the user, e.g. via an audio message.

Figure 3A:
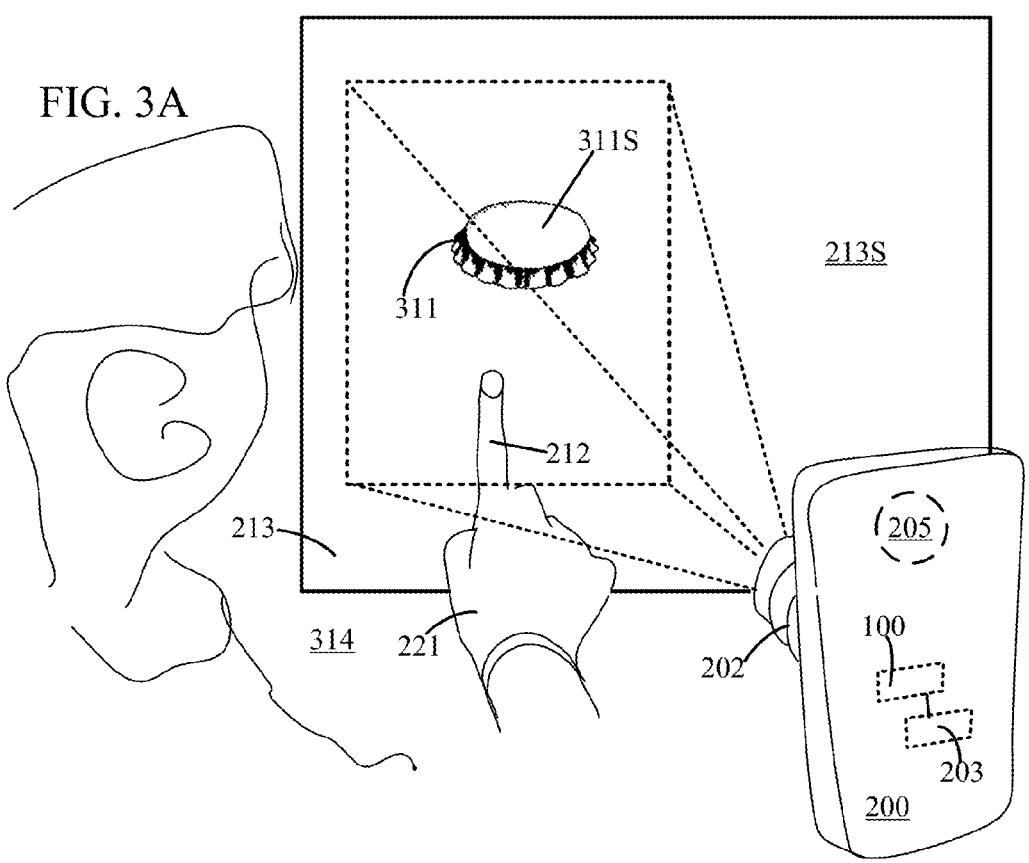
FIG. 3A illustrates another scene 314 in real world of another example, imaged by camera 202 of mobile device 200 for use in projection of information adjacent to another object 311 in the real world, in certain embodiments.
Figure 3B:
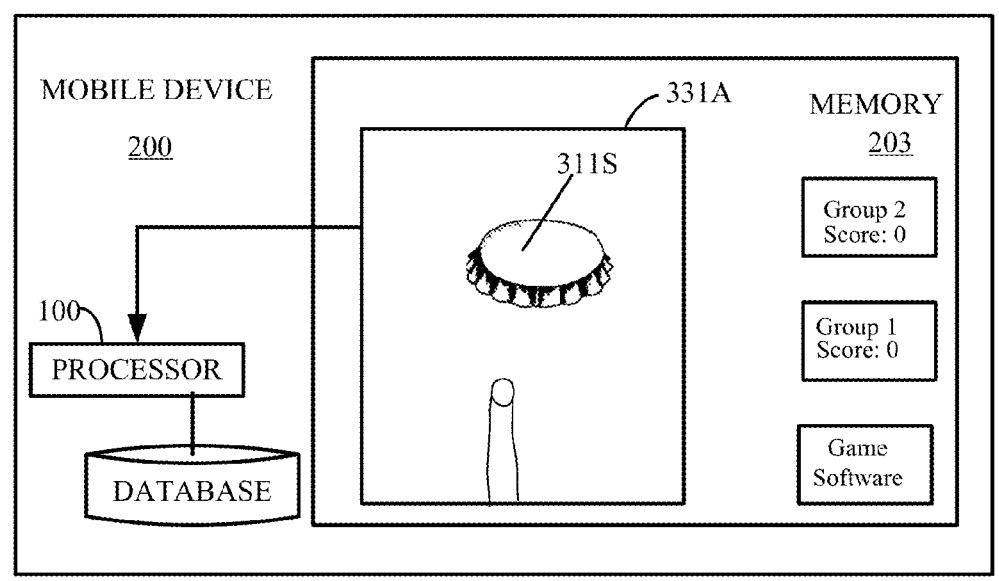
FIG. 3B illustrates, in a high-level block diagram similar to FIG. 2B, memory 203 storing a frame 331A of an input video 231 generated by camera 202 from the exemplary scene of FIG. 3A.
Figure 3C:
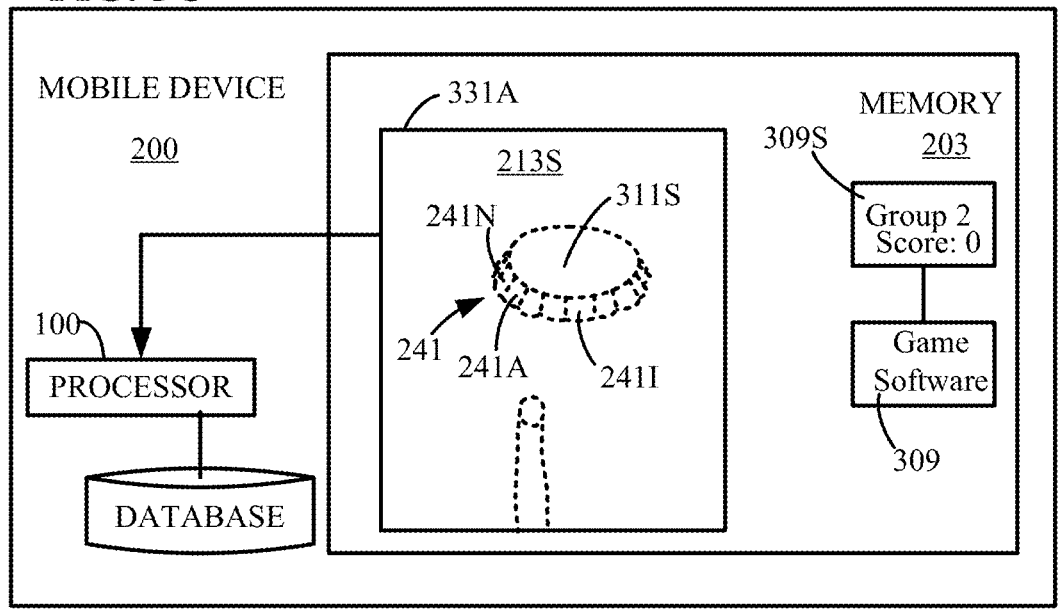
FIGS. 3C and 3D illustrate, in high-level block diagrams similar to FIG. 2B, memory 203 storing surfaces 241A-241N, 241S, and 213U as well as new positions of information 333A and 333B to avoid overlap of surface 2411.

Although in an example illustrated in FIGS. 2A-2H, the information is an output video 233 that is projected in its entirety within a surface 211A as illustrated in FIG. 2E, or within another surface 213S as illustrated in FIG. 2H, in other embodiments the information to be projected includes multiple elements (also called parts), each of which can be projected independently of another part (or element). Specifically, in an example illustrated in FIG. 3A, an object 311 (such as a bottle cap 241) that is located on surface 213S of table 213 is imaged by mobile device 200 as per act 101 (FIG. 1A), and the resulting image is stored in memory 203 as image 331A (FIG. 3B). Image 331A is thereafter segmented as per act 103 (FIG. 1A) to identify surfaces, such as surfaces 213S and 311S in scene 314 (FIG. 3A) which correspond to regions 213S and 311S in image 331A (FIG. 3C). In this manner, numerous additional regions 241A-241N (FIG. 3C) are identified by act 103.

Information to be projected in this example is generated by execution of game software 309 and stored in storage locations 309S of memory 203 as two distinct elements (or parts) that can be projected independent of one another, namely: (1) a first line of text for a player of the game (illustrated in FIG. 3C as the string of characters "Group 2") and (2) a second line of text for a score (illustrated in FIG. 3C as another string of characters "Score: 0") of that same player. By performance of a method of the type described above in reference to FIG. 1A, processor 100 determines each of regions 241A ... 241I ... 241N as being too small to display a first element (namely first text line 333A) in act 153 (FIG. 1B) which is therefore filtered out.

Figure 3D:
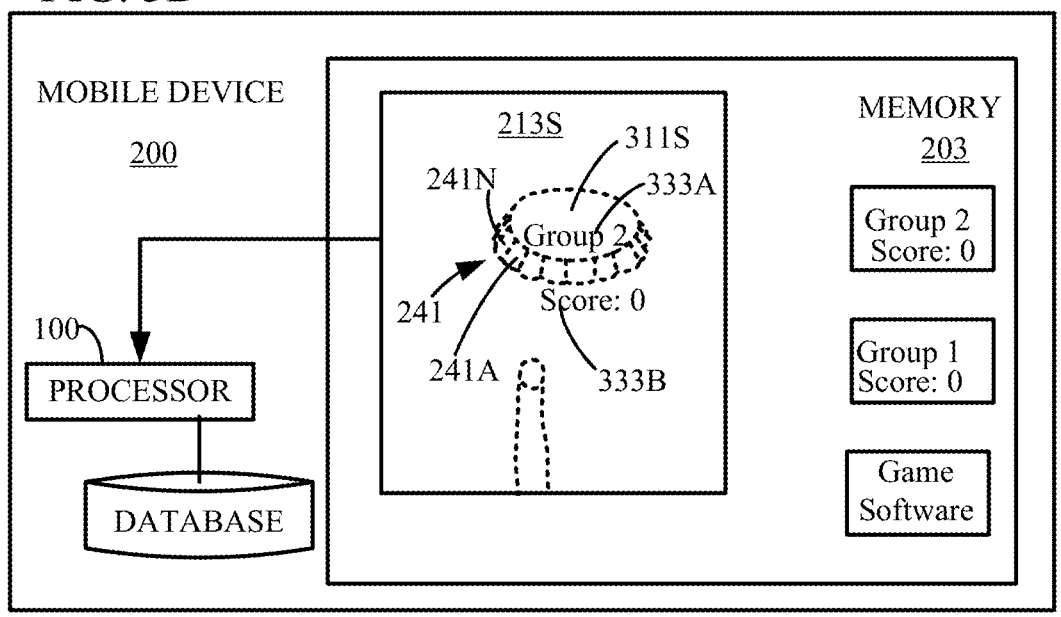

In this example, initially processor 100 identifies region 311S as being sufficiently large to display the first element and evaluates suitability in act 156. In act 156, processor 100 tests various positions of a rectangle to display the first text line 333A relative to surface 311S in scene 314 (which corresponds to region 311S in image 331A), and when a position is found to be suitable the surface 311S and the position are added by processor 100 as a first item in a list for the first text line 333A by act 162. In this example, next processor 100 identifies region 213S as being sufficiently large to also display the first element and evaluates suitability by repeating act 156. In this iteration of act 156, processor 100 tests various positions of the same rectangle to display the first text line 333A but this time relative to surface 213S in scene 314 (which corresponds to region 213S in image 331A), and when a position is found to be suitable the surface 213S and the position are added by processor 100 as a second item in the above-described list for the first text line by act 162. Accordingly, at this stage the list for the first text line has two items. Similarly, another list is generated by processor 100 for the second text line which also has two items. Finally, by performing act 164, processor 100 assigns to surface 311S the first text line 333A and assigns to surface 213S the second text line 333B (FIG. 3D), followed by operation of the projector 205 to generate a projection.

Figure 3E:
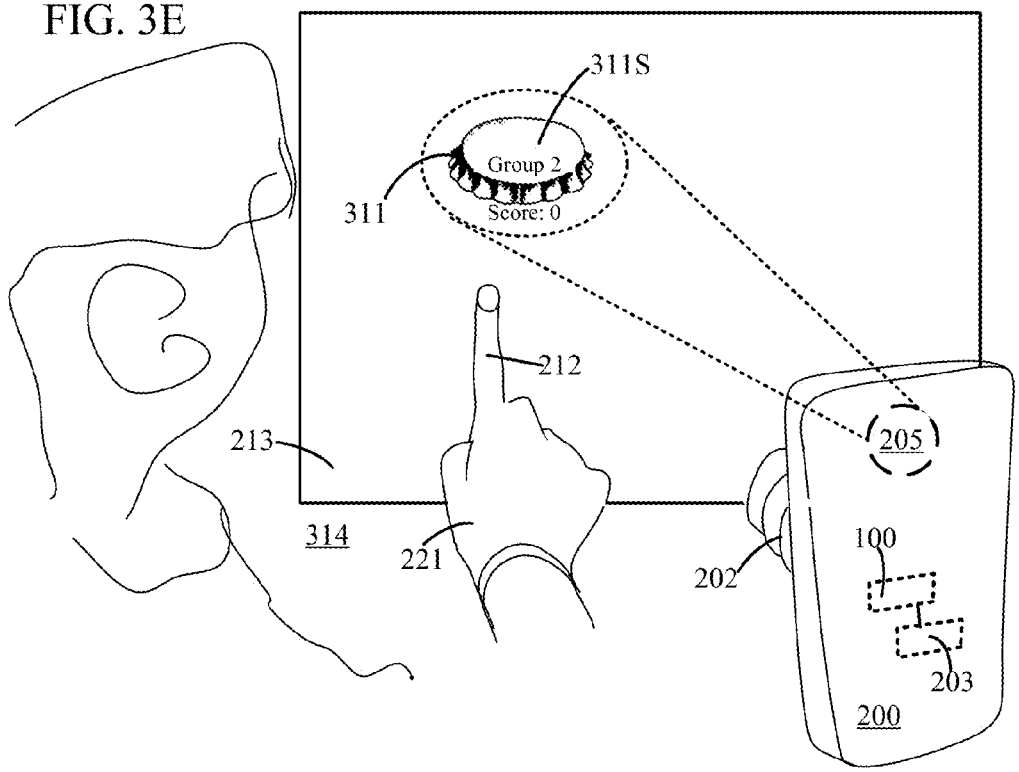
FIG. 3E illustrates scene 314 of FIG. 3A wherein information in the form of strings 333A and 333B is projected over and adjacent to object 311 by projector 205 of mobile device 200, in several embodiments.
Figure 3F:
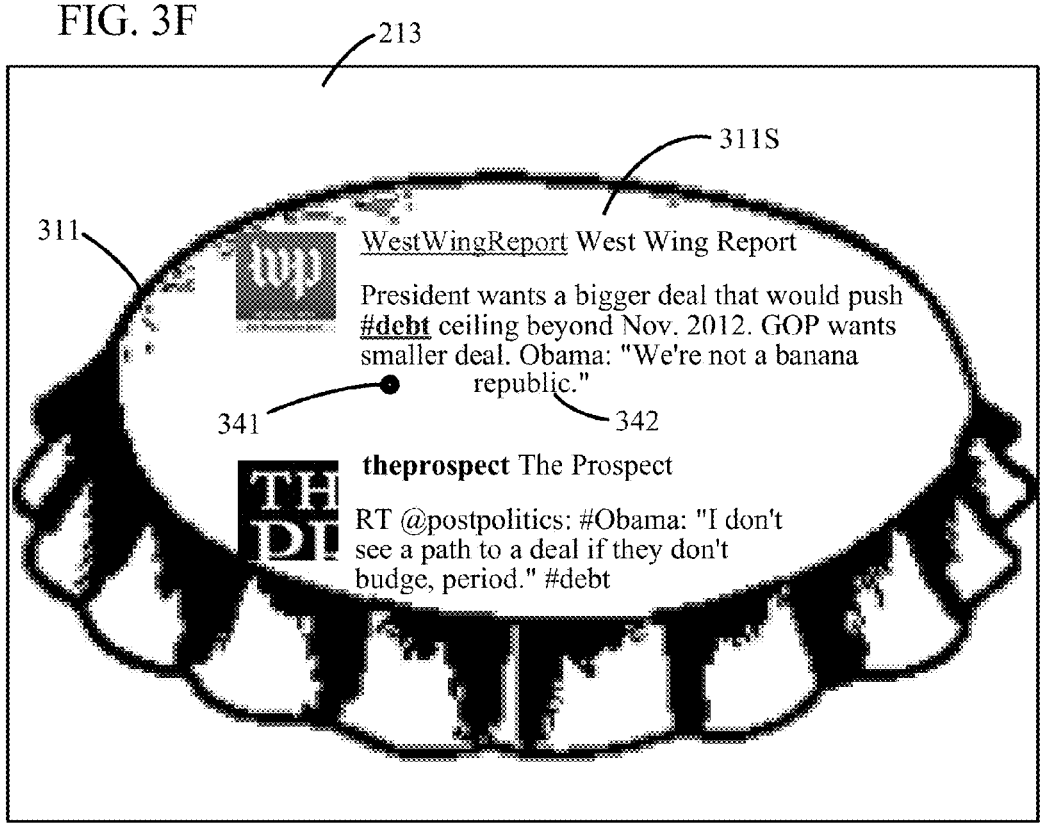
FIG. 3F illustrates scene 314 of FIG. 3A wherein an element 342 of information is projected at a new position, in several embodiments.

In some embodiments, processor 100 is programmed to optimize the position of each element that is assigned to a surface in act 164, e.g. so that two text lines 333A and 333B which constitute two elements are positioned as close to one another as possible, as illustrated in FIG. 3E. Note that although x-coordinate and y-coordinate increment have been indicated above as being performed by acts 158 and 160 of some embodiments, other embodiments may move a shape (such as a rectangle or a circle) for projection of an element in other ways, e.g. by rotation. In an example illustrated in FIG. 3F, information displayed by mobile device 200 on surface 311S is obtained from a computer (not shown) at the website www.twitter.com.

Processor 100 which is programmed with software in memory 203 as described above in reference to FIGS. 1, 2A-2H, 3A-3F and 4 may be included in a mobile device 200 as noted above. Mobile device 200 may be any device that includes a projector 205 and/or a camera 202, and device 200 may include additional parts that are normally used in any hand held device, e.g. motion sensors, such as accelerometers, gyroscopes or the like, which may be used in one or more acts described above, e.g. in determining the pose (position and orientation) of mobile device 200 relative to object 311 and/or table 213.

It should be understood that mobile device 200 may be any portable electronic device such as a cellular or other wireless communication device, personal communication system (PCS) device, personal navigation device (PND), Personal Information Manager (PIM), Personal Digital Assistant (PDA), laptop, camera, or other suitable mobile device that is capable of imaging scene 214 and/or projecting information into scene 214. In some embodiments, a single device 200 includes both camera 202 and projector 205 whereas in other embodiments one such device includes camera 202 and another such device includes projector 205 and both devices communicate with one another either directly or via a computer (not shown).

In performing the method of FIG. 1A to project information into a scene as described above, there might be different interaction metaphors used. User input that is generated from strings of text in images captured by camera 202 (FIG. 2A) allows a user to reach into scene 214 and manipulate real world object 211 directly, as opposed to non-image based interaction, where users must interact directly with a mobile device. Specifically, when image-based user interaction is chosen as an input technique and an output technique, methods of the type described above in reference to FIGS. 1A and 1B enable a user to use his hands in scene 214 with information projected into the real world, as the user is supplying input which changes the information being projected into scene 214.

A mobile device 200 of the type described above may include various object recognition methods using "computer vision" techniques. Mobile device 200 may also include a 3D surface segmentor software 511 (FIG. 4) to implement a watershed algorithm used in some embodiments of act 103 described above, to divide up image 231A, into regions of data 521 (also called "surface data") that belongs to different 3D surfaces (or patches) in scene 214. Furthermore, mobile device 200 may also include a surface finder 512 that finds a specific surface in the set of surfaces 521, on which an element of information can be projected, e.g. in a rectangle of height H and width W. Surface finder 512 which implements a means for finding in some embodiments also includes software to test (e.g. thereby to implement a means for testing) whether all pixels in the just-described rectangle are present in a region of image 231A corresponding to the specific surface. Surface finder 512 also selects from a library 522 of 3D models, a single model of a single 3D surface (among the surfaces identified in surface data 521), that is suitable to display the rectangle as described above in reference to act 106 (e.g. as implemented by the method of FIG. 1B) thereby to implement means for identifying in some embodiments.

Accordingly, in some embodiments, surface finder 512 supplies as its output an identifier of a 3D model and also coordinates of a position at which the rectangle can be displayed.

Mobile device 200 may also include information retriever software 513 to retrieve information 233 having one or more elements to be projected as per act 102 described above. An information transformer 514 in mobile device 200 includes two modules as follows: a transform function identifier and a transform function applier. The transform function identifier performs matrix inversion as per act 108 described above, and the transform function applier applies the inverted matrix generated by act108 to the element of information to obtain a transformed element 525 that is then stored in frame buffer 530 in memory 203 that is operatively coupled to projector 205, and projected into scene 214 on operation of projector 205. Hence, the information transformer 514 of some embodiments implements a means for storing.

Mobile device 200 may be also equipped with an IR or RF transmitter or a wireless a transmitter enabled to receive and/or transmit one or more signals over one or more types of wireless communication networks such as the Internet, WiFi, cellular wireless network or other network. Also, mobile device 200 may additionally include a graphics engine 1004, an image processor 1005, a IR camera 1006 (e.g. in an external Printed Circuit Board 1130) and a read only memory (ROM) 1007 to store firmware, and/or software, and/or constant data. Mobile device 200 may also include a disk 1008 (or one or more non-transitory computer readable storage media) to store software executed by processor 100. Mobile device 200 may further include a wireless transmitter and receiver 110 and/or any other communication interfaces 1009, touch screen 1001 or other screen 1002.

Depending on the embodiment, mobile device 200 may be programmed with gesture recognition software that uses a projector 205 in combination with camera 202. The projector 205 may be used to render a cell phone's display on everyday surfaces such as a wall, with which users can interact using hand gestures. Also depending on the embodiment, mobile device 200 may be designed to use an IR camera 1006 that tracks specialized IR laser stylus or gloves and supplies user input via an IR link 1131.

It should be understood that mobile device 200 may be any portable electronic device such as a cellular or other wireless communication device, personal communication system (PCS) device, personal navigation device (PND), Personal Information Manager (PIM), Personal Digital Assistant (PDA), laptop, camera, smartphone, tablet, or other suitable mobile device that is capable of creating an augmented reality (AR) environment.

Mobile device 200 of several described embodiments may also include means for remotely controlling a real world object which may be a toy, in response to user input e.g. by use of transmitter in transceiver 1010, which may be an IR or RF transmitter or a wireless a transmitter enabled to transmit one or more signals over one or more types of wireless communication networks such as the Internet, WiFi, cellular wireless network or other network. Of course, mobile device 200 may include other elements, such as a read-only-memory 1007 which may be used to store firmware for use by processor 100.

Also, depending on the embodiment, various functions of the type described herein may be implemented in software (executed by one or more processors or processor cores) or in dedicated hardware circuitry or in firmware, or in any combination thereof. Accordingly, depending on the embodiment, any one or more of surface segmentor 511, surface finder 512, information retriever 513, and information transformer 514 illustrated in FIG. 4 and described above can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

Hence, methodologies described herein may be implemented by various means depending upon the application. For example, these methodologies may be implemented in firmware in ROM 1007 (FIG. 4) or software, or hardware or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Any machine-readable medium tangibly embodying computer instructions may be used in implementing the methodologies described herein. For example, software 510 (FIG. 4) may include program codes stored in memory 203 and executed by processor 100. Memory may be implemented within or external to the processor 100. If implemented in firmware and/or software, the functions may be stored as one or more computer instructions or code on a computer-readable medium. Examples include nontransitory computer-readable storage media encoded with a data structure (such as a sequence of images) and computer-readable media encoded with a computer program (such as software 510 that can be executed to perform the method of FIGS. 1A-1B).

Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store program code in the form of software instructions (also called "processor instructions" or "computer instructions") or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Hence, although item 200 shown in FIG. 4 of some embodiments is a mobile device, in other embodiments item 200 is implemented by use of form factors that are different, e.g. in certain other embodiments item 200 is a mobile platform (such as a tablet, e.g. iPad available from Apple, Inc.) while in still other embodiments item 200 is any electronic device or system. Illustrative embodiments of such an electronic device or system 200 may include multiple physical parts that intercommunicate wirelessly, such as a processor and a memory that are portions of a stationary computer, such as a lap-top computer, a desk-top computer, or a server computer communicating over one or more wireless link(s) with sensors and user input circuitry enclosed in a housing that is small enough to be held in a hand.

Although several aspects are illustrated in connection with specific embodiments for instructional purposes, the present invention is not limited thereto. Various adaptations and modifications may be made without departing from the scope of the described embodiments. Therefore, the spirit and scope of the appended claims should not be limited to the foregoing description.

What is claimed is:

1. A method comprising:
   receiving an image of a scene in real world, the image comprising a plurality of distances to points in the real world;
   using at least the plurality of distances, to identify a set of surfaces in the scene;
   selecting an element of information to project on to the scene, the selected element of information having a size, the information comprising multiple elements that are independent of one another and can be projected on different surfaces;
   comparing the size of the selected element to a size of a surface in the set of surfaces;
   selecting the surface from the set of surfaces, on which the selected element of information can be projected, selection of the surface being based at least in part on the size of the surface being found by the comparing to be sufficiently large to accommodate the element;
   one or more processors identifying a transform function to use the surface;
   applying to at least the selected element of information, the transform function; and
   storing in a frame buffer in a memory, at a specific position, a transformed element resulting from the applying.

2. The method of claim 1 wherein:
   an area of a rectangle to display the selected element of information is compared to a total number of pixels in a region of the image corresponding to the surface.

3. The method of claim 1 wherein:
   the selection of the surface comprises testing whether all pixels in a rectangle to be used to project the selected element of information are present in a region of the image corresponding to the surface.

4. The method of claim 1 wherein:
   during selection of the surface, another specific position is identified on the surface, and stored in the memory.

5. The method of claim 3 wherein:
   the testing is performed repeatedly, to associate with the selected element of information, multiple surfaces that form a subset of the set of surfaces, such that the selected element of information can be projected on each of the multiple surfaces;
   the method further comprises assigning projection of the selected element of information to the surface which is selected from the subset.

6. The method of claim 1 further comprising:
   operating a projector to project the transformed element in the frame buffer;
   receiving a user input, subsequent to the operating; and
   in response to receipt of the user input, repeating for a different surface, the identifying of the transform function, the applying and the storing.

7. The method of claim 6 wherein:
the user input identifies the different surface.

8. The method of claim 6 wherein:
the user input is identified as a hand gesture in another image.

9. The method of claim 1 further comprising:
receiving user input identifying the different surface when the finding indicates the selected element of information cannot be projected on any surface in the set of surfaces; and
repeating for the different surface, the identifying of the transform function, the applying and the storing.

10. The method of claim 1 further comprising:
receiving user input identifying a shape; and
using the shape in the transform function, to mask out a portion of the selected element of information.

11. One or more non-transitory computer readable storage media comprising:
instructions to receive an image of a scene in real world, the image comprising a plurality of distances to points in the scene;
instructions to use at least the plurality of distances in the image, to identify a set of surfaces in the scene;
instructions to select an element of information to project on to the scene, the selected element of information having a size, the information comprising multiple elements that are independent of one another and can be projected on different surfaces;
instructions to compare the size of the selected element to a size of a surface in the set of surfaces;
instructions to select the surface from the set of surfaces, on which the selected element of information can be projected, selection of the surface being based at least in part on the size of the surface being found by execution of the instructions to compare to be sufficiently large to accommodate the element;
instructions to one or more processors to identify a transform function to use the surface
instructions to apply to at least the selected element of information, the transform function; and
instructions to store in a frame buffer in a memory, at a specific position, a transformed element resulting from execution of the instructions to apply.

12. The one or more non-transitory computer readable storage media of claim 11 wherein:
the instructions to select comprise instructions to compare a total number of pixels in a region of the image corresponding to the surface with an area of a rectangle to display the selected element of information.

13. The one or more non-transitory computer readable storage media of claim 11 wherein:
the instructions to select comprise instructions to test whether all pixels in a rectangle to be used to display the selected element of information are present in a region of the image corresponding to the surface.

14. The one or more non-transitory computer readable storage media of claim 13 wherein:
another specific position is identified on the surface by execution of the instructions to select.

15. The one or more non-transitory computer readable storage media of claim 13 wherein:
the instructions to test are configured to be executed repeatedly, to associate with the selected element of information, multiple surfaces that form a subset of the set of surfaces, such that the selected element of information can be projected on each of the multiple surfaces;
the one or more non-transitory computer readable storage media further comprise instructions to assign projection of the selected element of information to the surface which is selected from the subset.

16. The one or more non-transitory computer readable storage media of claim 11 wherein:
instructions to operate a projector to project the transformed element in the frame buffer; and
instructions to receive a user input, subsequent to the operating; and
instructions to execute for a different surface, the instructions to identify the transform function, the instructions to apply and the instructions to store.

17. The one or more non-transitory computer readable storage media of claim 16 wherein:
the user input identifies the different surface.

18. The one or more non-transitory computer readable storage media of claim 16 wherein:
the user input is identified in at least another image.

19. The one or more non-transitory computer readable storage media of claim 11 further comprising:
instructions to receive a user input identifying the different surface, configured to be executed when execution of the instructions to check indicates the selected element of information cannot be projected on any surface in the set of surfaces; and
instructions to repeat for the different surface, the instructions to identify the transform function, the instructions to apply and the instructions to store.

20. The one or more non-transitory computer readable storage media of claim 11 further comprising:
instructions to receive a user input identifying a shape; and
instructions to use the shape in the transform function, to mask out a portion of the selected element of information.

21. One or more devices comprising:
a camera;
one or more processors operatively coupled to the camera;
memory operatively coupled to the one or more processors;
a projector operatively coupled to a frame buffer in the memory, to project information therefrom; and
software held in the memory that when executed by the one or more processors, causes the one or more processors to:
receive from the camera an image of a scene in real world, the image comprising a plurality of distances to points in the real world;
use at least the plurality of distances, to identify a set of surfaces in the scene;
select an element of information to project on to the scene, the selected element of information having a size, the information comprising multiple elements that are independent of one another and can be projected on different surfaces;
compare the size of the selected element to a size of a surface in the set of surfaces;
select the surface from the set of surfaces, on which the selected element of information can be projected, selection of the surface being based at least in part on the size of the surface being found by comparison to be sufficiently large to accommodate the element;
identify a transform function to use the surface;
apply to at least the selected element of information, the transform function; and
store in the frame buffer, at a specific position, a transformed element resulting from application of the transform function.

22. The one or more devices of claim 21 wherein:
the software to check causes the one or more processors to test whether all pixels in a rectangle to be used to display the selected element of information are present in a region of the image corresponding to the surface.

23. The one or more devices of claim 22 wherein:
the software to test is executed repeatedly, to associate with the selected element of information, multiple surfaces that form a subset of the set of surfaces, such that the selected element of information can be projected on each of the multiple surfaces;
the software further causes assignment of projection of the selected element of information to whichever surface in the subset has fewest number of elements associated therewith.

24. A system comprising a processor operatively coupled to a memory and a camera, the system comprising:
means for receiving an image of a scene in real world, the image comprising a plurality of distances to points in the real world;
means for using at least the plurality of distances, to identify a set of surfaces in the scene;
means for selecting an element of information to project on to the scene, the selected element of information having a size, the information comprising multiple elements that are independent of one another and can be projected on different surfaces;
means for comparing the size of the selected element to a size of a surface in the set of surfaces;
means for selecting the surface from the set of surfaces, on which the selected element of information can be projected, selection of the surface being based at least in part on the size of the surface being found by the means for comparing to be sufficiently large to accommodate the element;
means for identifying a transform function to use the surface;
means for applying to at least the element of information, the transform function; and
means for storing in a frame buffer in the memory, at a specific position, a transformed element output by the means for applying.

25. The system of claim 24 wherein the means for finding comprises:
means for testing whether all pixels in a rectangle to be used to display the selected element of information are present in a region of the image corresponding to the surface.

26. The system of claim 25 wherein:
the means for testing is configured to be operated repeatedly, to associate with the selected element of information, multiple surfaces that form a subset of the set of surfaces, such that the selected element of information can be projected on each of the multiple surfaces; and
projection of the selected element of information is assigned to whichever surface in the subset has fewest number of elements associated therewith.

* * * * *